(12) United States Patent
Kim et al.

(10) Patent No.: US 9,807,298 B2
(45) Date of Patent: Oct. 31, 2017

(54) APPARATUS AND METHOD FOR PROVIDING USER'S EMOTIONAL INFORMATION IN ELECTRONIC DEVICE

(71) Applicant: Samsung Electronics Co., Ltd., Suwon-si, Gyeonggi-do (KR)

(72) Inventors: Dae-Sung Kim, Seoul (KR); So-Ra Kim, Seoul (KR); Hyun-Kyoung Kim, Seoul (KR); Hang-Kyu Park, Seoul (KR); Seung-Kyung Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/147,842

(22) Filed: Jan. 6, 2014

(65) Prior Publication Data
US 2014/0192229 A1   Jul. 10, 2014

(30) Foreign Application Priority Data
Jan. 4, 2013   (KR) ........................ 10-2013-0001087

(51) Int. Cl.
| | |
|---|---|
| H04N 5/232 | (2006.01) |
| H04N 5/225 | (2006.01) |
| H04N 1/32 | (2006.01) |
| H04N 1/00 | (2006.01) |
| G06K 9/00 | (2006.01) |
| H04N 101/00 | (2006.01) |

(52) U.S. Cl.
CPC ..... *H04N 5/23219* (2013.01); *G06K 9/00302* (2013.01); *H04N 1/00339* (2013.01); *H04N 1/32101* (2013.01); *H04N 1/32128* (2013.01); *H04N 5/2258* (2013.01); *H04N 2101/00* (2013.01); *H04N 2201/0084* (2013.01); *H04N 2201/3204* (2013.01); *H04N 2201/3225* (2013.01)

(58) Field of Classification Search
CPC .... H04N 5/23219; H04N 5/772; H04N 5/907; H04N 1/2112; H04N 1/32128; H04N 5/23293; H04N 5/2258; G06K 9/00302
See application file for complete search history.

(56) References Cited

U.S. PATENT DOCUMENTS

| | | | |
|---|---|---|---|
| 8,605,958 B2 * | 12/2013 | Seo | 382/118 |
| 2004/0101212 A1 * | 5/2004 | Fedorovskaya | 382/305 |
| 2008/0052080 A1 | 2/2008 | Narayanan | |
| 2009/0231457 A1 * | 9/2009 | Lee | H04N 5/23219 348/222.1 |
| 2009/0317060 A1 * | 12/2009 | Han | G11B 27/034 386/248 |
| 2011/0043602 A1 | 2/2011 | Lee | |
| 2012/0014816 A1 | 1/2012 | Kim | |
| 2012/0148161 A1 | 6/2012 | Kim | |
| 2013/0038756 A1 * | 2/2013 | Cheng | 348/231.99 |

FOREIGN PATENT DOCUMENTS

JP       2010148052 A       7/2010

* cited by examiner

*Primary Examiner* — Paul Berardesca
(74) *Attorney, Agent, or Firm* — Jefferson IP Law, LLP

(57) ABSTRACT

An apparatus and a method for providing emotional information in an electronic device are provided. At least one content is displayed. Emotional information is extracted from an image obtained via a camera. The emotional information is added to the content.

24 Claims, 37 Drawing Sheets

APPARATUS AND METHOD FOR PROVIDING USER'S EMOTIONAL INFORMATION IN ELECTRONIC DEVICE

CROSS-REFERENCE TO RELATED APPLICATION(S)

This application claims the benefit under 35 U.S.C. §119(a) of a Korean patent application filed in the Korean Intellectual Property Office on Jan. 4, 2013 and assigned Serial number 10-2013-0001087, the entire disclosure of which is hereby incorporated by reference.

TECHNICAL FIELD

The present disclosure relates to an apparatus and a method for providing a user's emotional information in an electronic device.

BACKGROUND

As an electronic device provides a multimedia service, a user of the electronic device increasingly requires various services via the electronic device. Accordingly, the electronic device may provide a service using emotional information included in content as a way for meeting the user's various needs. For example, a portable electronic device may provide a service using emotion regarding an object included in a photo.

When a service using emotional information included in content is provided, the electronic device may estimate emotional information included in the content such as, for example, a photo. However, when an object such as a person or an animal from which a user may estimate emotion does not exist in the content (e.g., a photo), the electronic device cannot estimate emotion for the relevant content (e.g., the relevant photo). In addition, because the electronic device cannot estimate the emotion of a user who has taken a picture from a photo, the electronic device has a limitation in providing a service using emotion. Accordingly, a method for determining emotion of a user who uses content and adding the emotion to content in an electronic device is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for adding emotional information of a user who uses content to content.

Another aspect of the present disclosure is to provide an apparatus and a method for adding a user's emotional information recognized via a second camera to an image shot via a first camera in an electronic device.

Another aspect of the present disclosure is to provide an apparatus and a method for adding a user's emotional information recognized via a second camera to a moving picture shot via a first camera in an electronic device.

Another aspect of the present disclosure is to provide an apparatus and a method for adding a user's emotional information recognized via a camera to a moving picture being reproduced when an electronic device reproduces the moving picture.

Another aspect of the present disclosure is to provide an apparatus and a method for adding a user's emotional information recognized via a camera to electronic book content when an electronic device provides an electronic book service.

Another aspect of the present disclosure is to provide an apparatus and a method for adding a user's emotional information recognized via a camera to purchasable goods information in an electronic device.

Another aspect of the present disclosure is to provide an apparatus and a method for retrieving content using emotional information added to content in an electronic device.

Another aspect of the present disclosure is to provide an apparatus and a method for classifying content using emotional information added to content in an electronic device.

In accordance with an aspect of the present disclosure, a method for providing emotional information in an electronic device is provided. The method includes displaying at least one content, extracting emotional information from an image obtained via a camera, and adding the emotional information to the content.

In accordance with another aspect of the present disclosure, an electronic device is provided. The electronic device includes at least one camera, a display unit, and at least one processor, wherein the at least one processor operatively displays at least one content on the display unit, extracts emotional information from an image obtained via at least one of the at least one camera, and adds the emotional information to the content.

In accordance with another aspect of the present, a method for capturing emotional information in an electronic device is provided. The method includes capturing an image of at least one user via a camera while the electronic device is providing a service, extracting emotional information of the at least one user, and associating the emotional information of the at least user with the service being provided when the image of the at least one user is captured.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
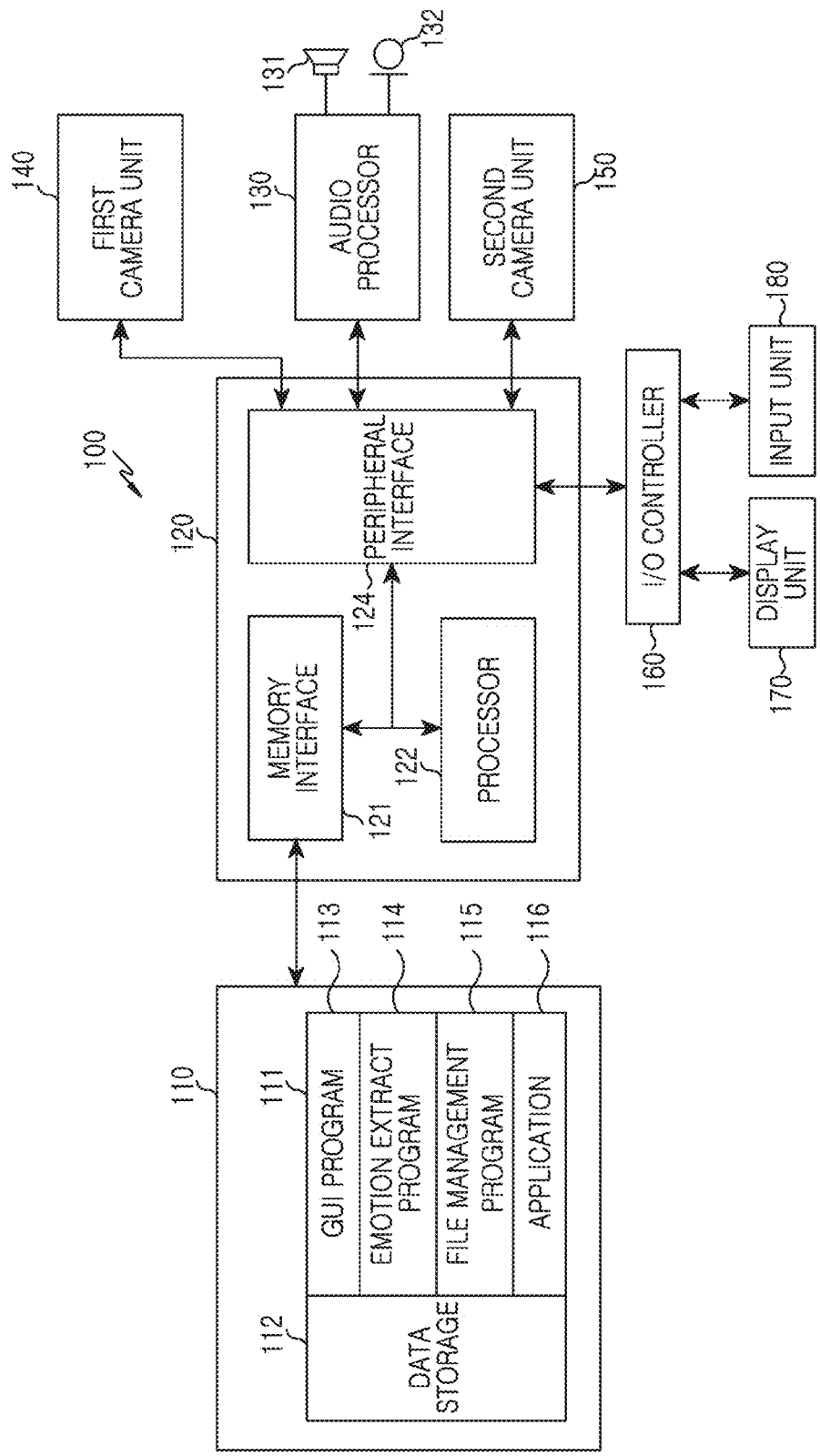
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure are provided for illustration purpose only and not for the purpose of limiting the present disclosure as defined by the appended claims and their equivalents.

Hereinafter, a technology for adding a user's emotional information to content in an electronic device is described.

According to various embodiments of the present disclosure, the electronic device includes a mobile communication terminal, a Personal Digital Assistant (PDA), a Personal Computer (PC), a laptop computer, a tablet computer, a smartphone, a video phone, an e-book reader, a netbook, a Mobile Internet Device (MID), an Ultra Mobile PC (UMPC), a tablet PC, a navigation, a Portable Multimedia Player (PMP), an MP3 player having a camera, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV) (e.g., a smart TV), a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a block diagram illustrating an electronic device according to an embodiment of the present disclosure.

Referring to FIG. 1, the electronic device 100 includes a memory 110, a processor unit 120, an audio processor 130, a first camera unit 140, a second camera unit 150, an Input/Output (I/O) controller 160, a display unit 170, and an input unit 180. According to various embodiments of the present disclosure, a plurality of memories 110 may exist.

The memory 110 includes a program storage 111 for storing a program for controlling an operation of the electronic device 100, and a data storage 112 for storing data generated during execution of a program.

The data storage 112 stores a user's emotional information for content. For example, the data storage 112 may store content to which an emotional tag for user emotional information extracted via an emotion extract program 114 has been added. For another example, the data storage 112 may store at least one content and metadata including emotional information of each content. For example, the data storage 112 may store at least one content and an emotional information table including emotional information of each content.

The program storage 111 includes a Graphic User Interface (GUI) program 113, the emotion extract program 114, a file management program 115, and at least one application 116. According to various embodiments of the present disclosure, a program included in the program storage 111 is a set of instructions and may be expressed as an instruction set.

Figure 18A:
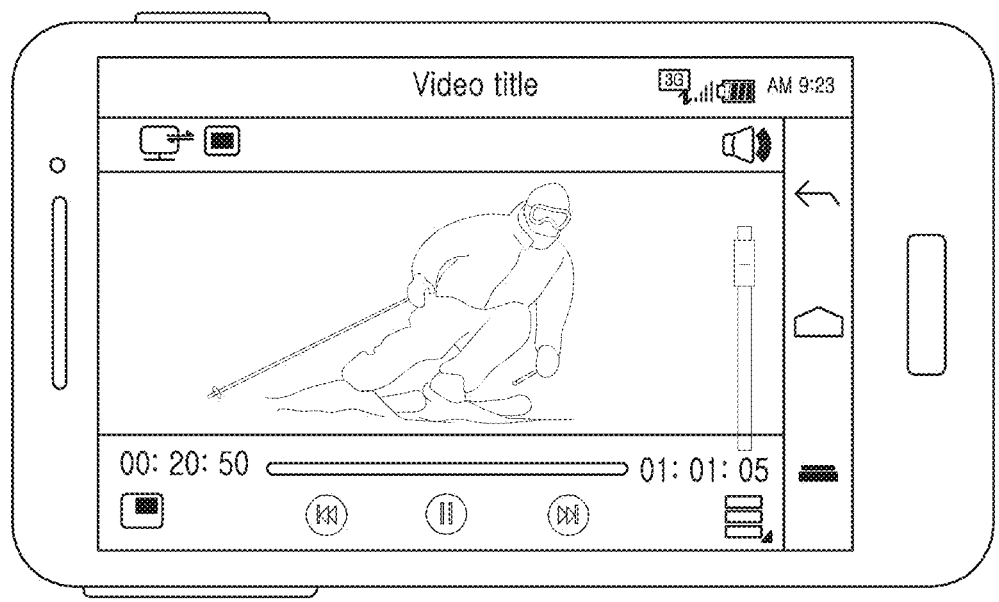
FIGS. 18A, 18B, and 18C are views illustrating screen configuration for displaying a moving picture with consideration of emotional information in an electronic device according to an embodiment of the present disclosure.
Figure 18B:
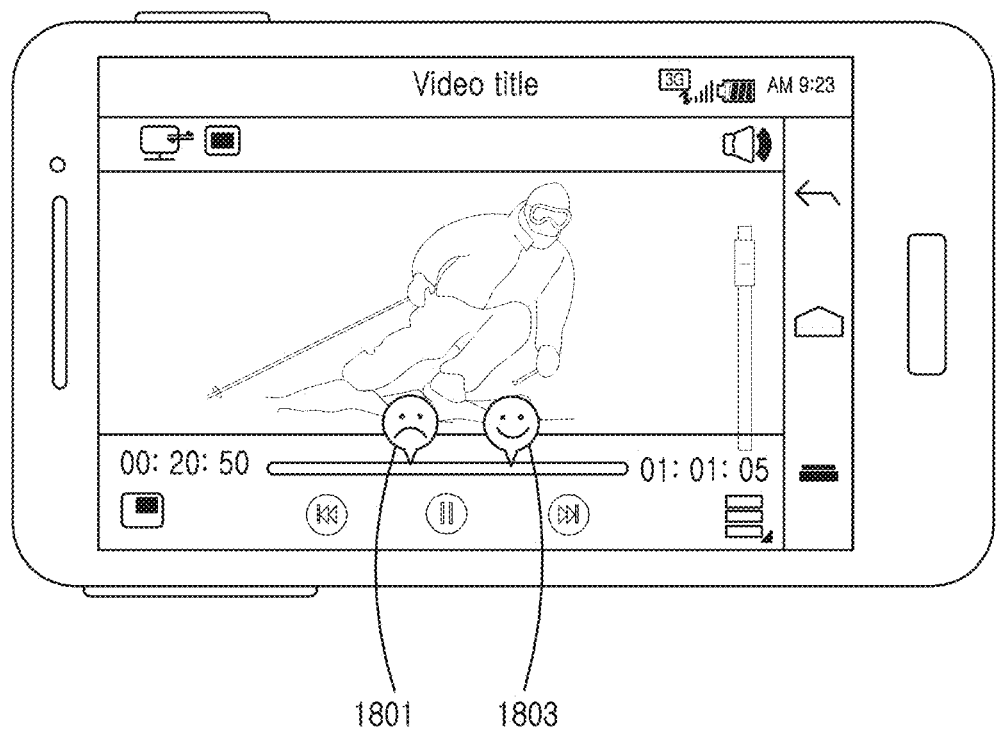
Figure 18C:
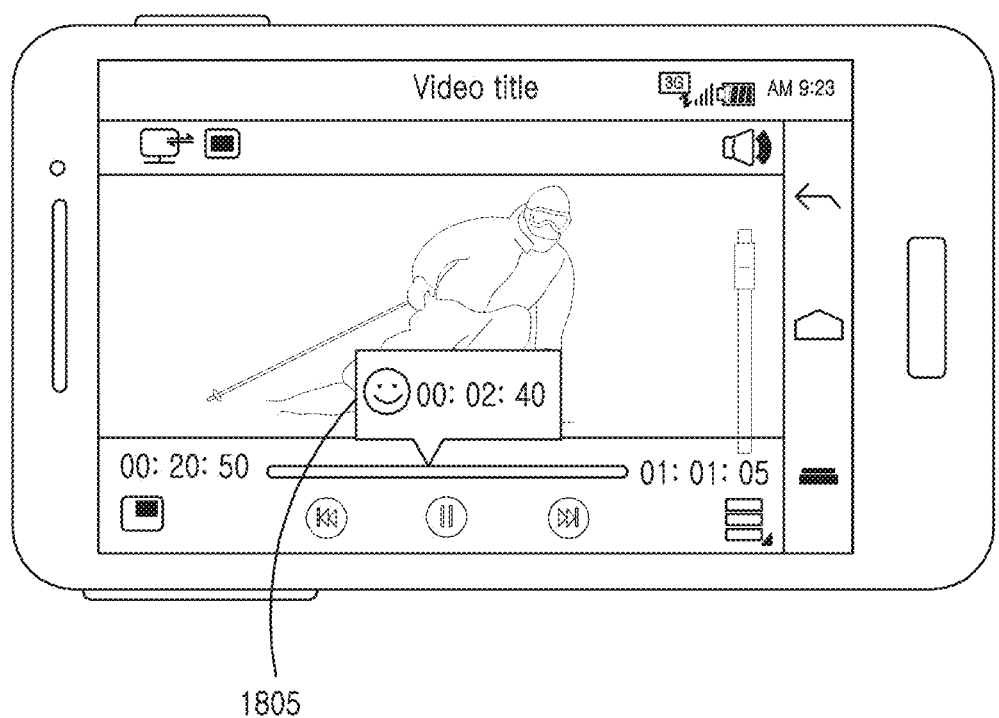

FIGS. 18A, 18B, and 18C are views illustrating screen configuration for displaying a moving picture with consideration of emotional information in an electronic device according to an embodiment of the present disclosure.

The GUI program 113 includes at least one software element for providing a user interface on the display unit 170 using graphics. For example, the GUI program 113 may control to display information of an application driven by a processor 122 on the display unit 170. In the case in which an emotion display menu has been set, the GUI program 113 may control to display a user's emotional information for content displayed on the display unit 170.

Referring to FIGS. 18A, 18B, and 18C, according to various embodiments of the present disclosure, when reproducing a moving picture, if an emotion display menu has been set, the GUI program 113 may control to display emotional information 1801, 1803 and 1805 on a time search bar for the moving picture, as illustrated in FIGS. 18B and 18C.

Figure 22A:
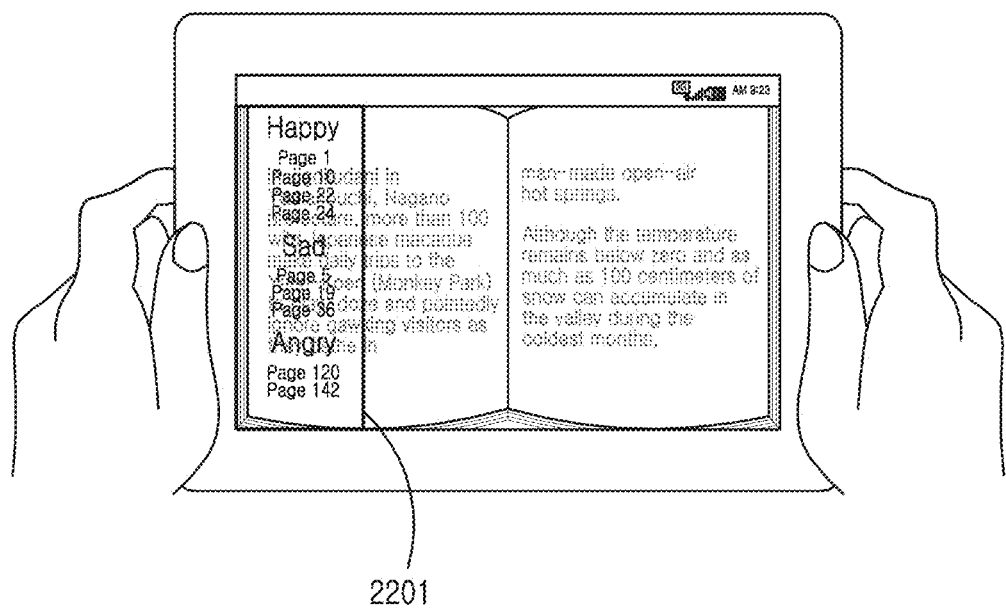
FIGS. 22A and 22B are views illustrating screen configuration for displaying electronic book content with consideration of emotional information in an electronic device according to an embodiment of the present disclosure.
Figure 22B:
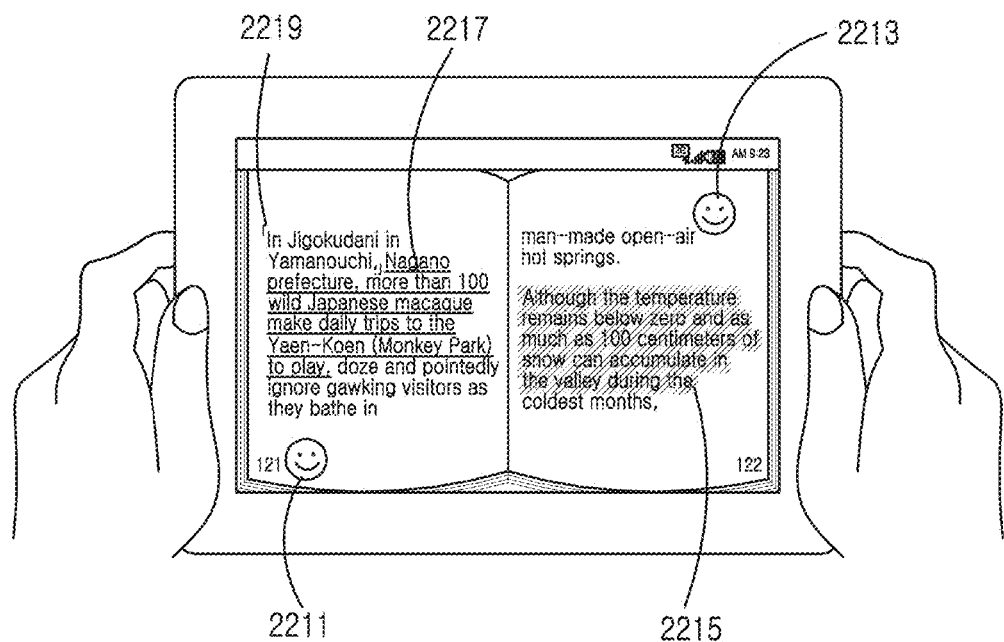

FIGS. 22A and 22B are views illustrating screen configuration for displaying electronic book content with consideration of emotional information in an electronic device according to an embodiment of the present disclosure.

Referring to FIGS. 22A and 22B, according to various embodiments of the present disclosure, if the emotion display menu has been set when providing an electronic book service, the GUI program 113 may control to additionally display emotional information 2211 and 2213 on electronic book content displayed on the display unit 170 as illustrated in FIG. 22B.

According to various embodiments of the present disclosure, if the emotion display menu has been set when providing a shopping service, the GUI program 113 may control to additionally display emotional information on goods information.

The emotion extract program 114 includes at least one software element for extracting a user's emotional information. For example, the emotion extract program 114 estimates movements of a plurality of facial muscles for estimating emotional information from a user's facial image obtained via the first camera unit 140 and the second camera unit 150. After estimating movements of a plurality of facial muscles for estimating emotional information from a user's facial image, the emotion extract program 114 extracts the user's emotion with consideration of movement information for the facial muscles. If an emotion estimation value calculated with consideration of the movement information of the facial muscles exceeds a reference emotion value, the emotion extract program 114 may recognize that the emotion extract program 114 has extracted the user's emotion for relevant content.

The emotion extract program 114 may selectively activate the first camera unit 140 or the second camera unit 150 in order to obtain a user image. For example, the emotion extract program 114 may extract the user's emotional information using a user image obtained via the second camera unit 150 at a point of capturing an image via the first camera unit 140. At this point, the emotion extract program 114 may activate the second camera unit 150 when taking a photograph via the first camera unit 140.

According to various embodiments of the present disclosure, the emotion extract program 114 may extract the user's emotional information using the user image obtained via the second camera unit 150 while capturing a moving picture via the first camera unit 140. At this point, the emotion extract program 114 may activate the second camera unit 150 when capturing a moving picture via the first camera unit 140.

According to various embodiments of the present disclosure, the emotion extract program 114 may extract the user's emotional information using a user image obtained via the second camera unit 150 while reproducing a moving picture. At this point, the emotion extract program 114 may activate the second camera unit 150 when reproducing the moving picture.

According to various embodiments of the present disclosure, the emotion extract program 114 may extract the user's emotional information using a user image obtained via the second camera unit 150 while providing an electronic book service. At this point, the emotion extract program 114 may activate the second camera unit 150 when providing the electronic book service.

According to various embodiments of the present disclosure, the emotion extract program 114 may extract the user's emotional information using a user image obtained via the second camera unit 150 at a point of determining purchasable goods information. At this point, the emotion extract program 114 may activate the second camera unit 150 when providing a shopping service.

According to various embodiments of the present disclosure, the emotion extract program 114 may extract the user's emotional information using a user image obtained via the second camera unit 150 at a point of purchasing goods. At this point, the emotion extract program 114 may activate the second camera unit 150 when providing a shopping service.

According to various embodiments of the present disclosure, the emotion extract program 114 may extract the user's emotional information using a user image obtained via the second camera unit 150 at a point of reading and/or viewing a communication (e.g., an email, a text message, an instant message, and/or the like). At this point, the emotion extract program 114 may activate the second camera unit 150 when a communication is being displayed and/or read.

According to various embodiments of the present disclosure, the emotion extract program 114 may extract the user's emotional information using a user image obtained via the second camera unit 150 at a point of providing an on-line dating service. At this point, the emotion extract program 114 may activate the second camera unit 150 when a communication is being displayed and/or read, when a profile is being viewed, and/or the like.

According to various embodiments of the present disclosure, the emotion extract program 114 may extract the user's emotional information using a user image obtained via the second camera unit 150 at a point of providing a Social Networking Service (SNS). At this point, the emotion extract program 114 may activate the second camera unit 150 when a communication is being displayed and/or read, when a profile is being viewed, when a status is being updated, when a status is being viewed and/or read, and/or the like.

The file management program 115 includes at least one software element for retrieving, classifying, and reproducing each content using emotional information for content stored in the data storage 112.

FIGS. 15A, 15B, 15C, and 15D are views illustrating screen configuration for displaying a photo with consideration of emotional information in an electronic device according to an embodiment of the present disclosure.

Figure 15A:
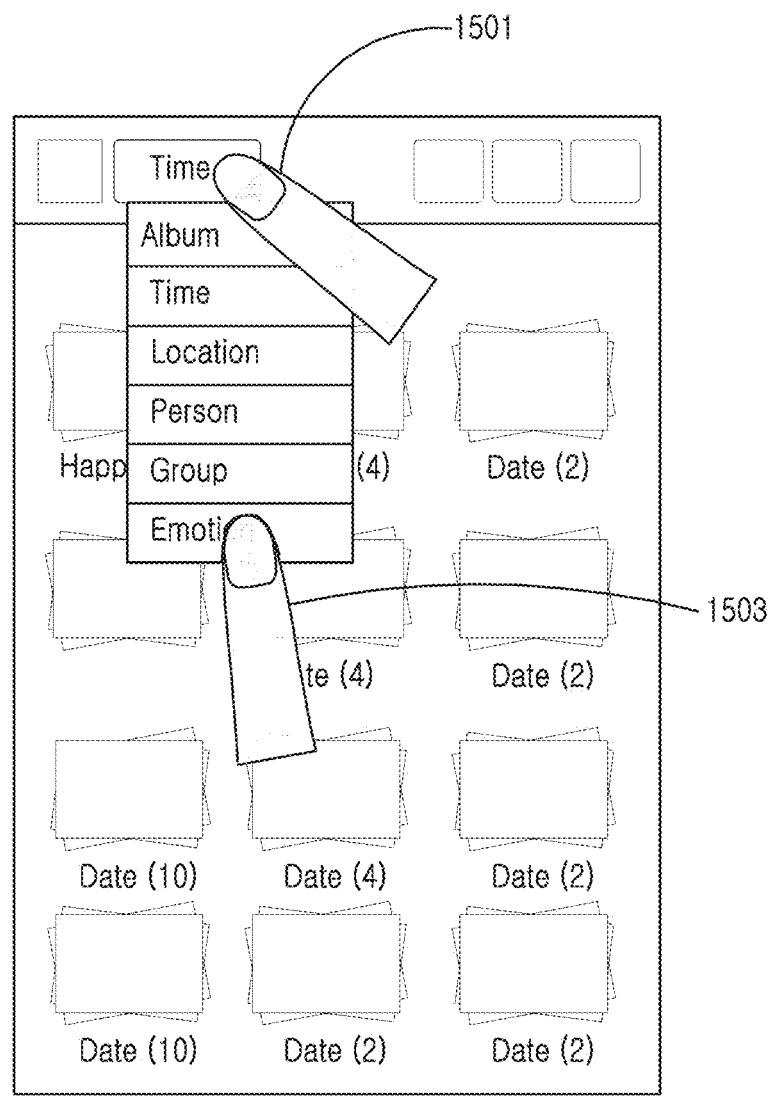
FIGS. 15A, 15B, 15C, and 15D are views illustrating screen configuration for displaying a photo with consideration of emotional information in an electronic device according to an embodiment of the present disclosure.
Figure 15B:
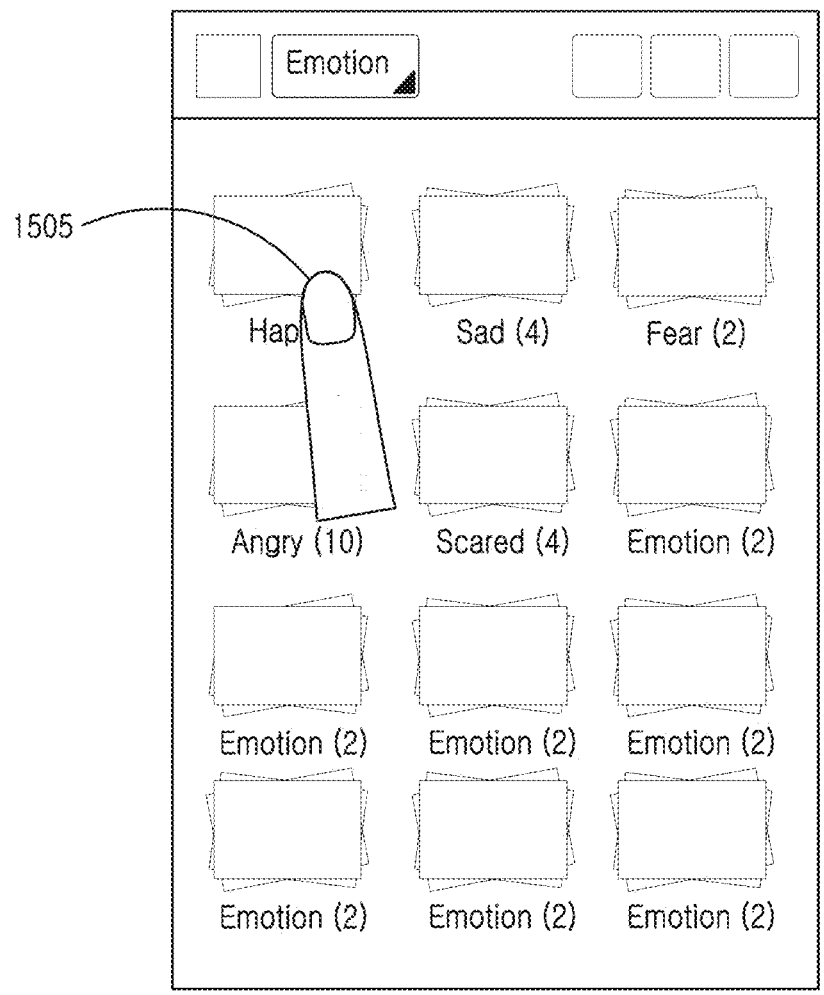
Figure 15C:
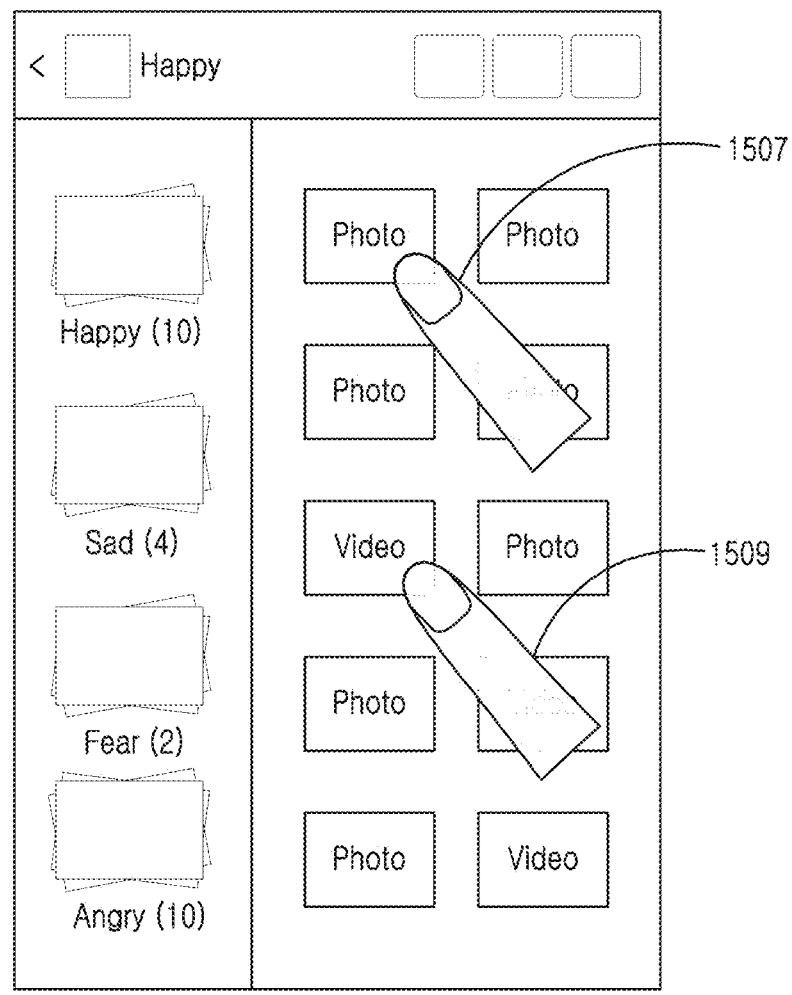

Referring to FIGS. 15A, 15B, 15C, and 15D, according to various embodiments of the present disclosure, the file management program 115 may control to classify and display photo content stored in the data storage 112 depending on emotional information as illustrated in FIGS. 15B and 15C.

Figure 19A:
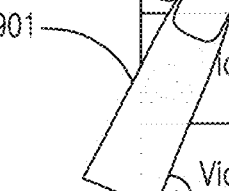
FIGS. 19A, 19B, and 19C are views illustrating screen configuration for displaying a moving picture with consideration of emotional information in an electronic device according to an embodiment of the present disclosure.
Figure 19B:
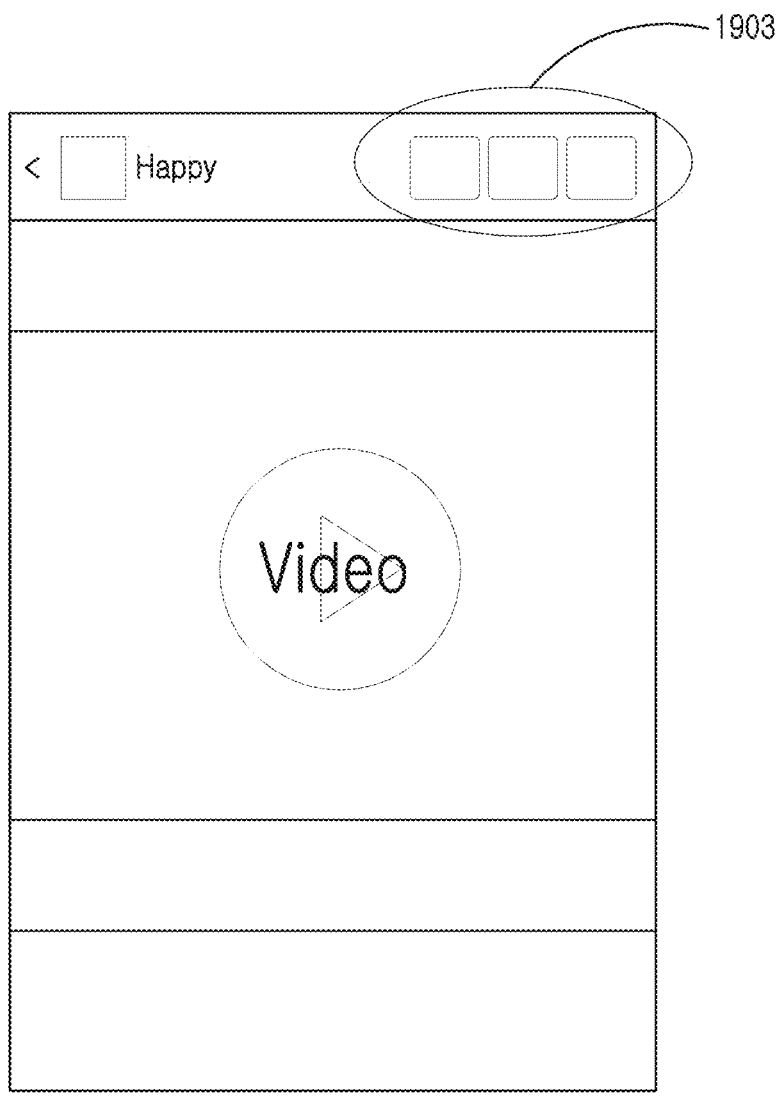
Figure 19C:
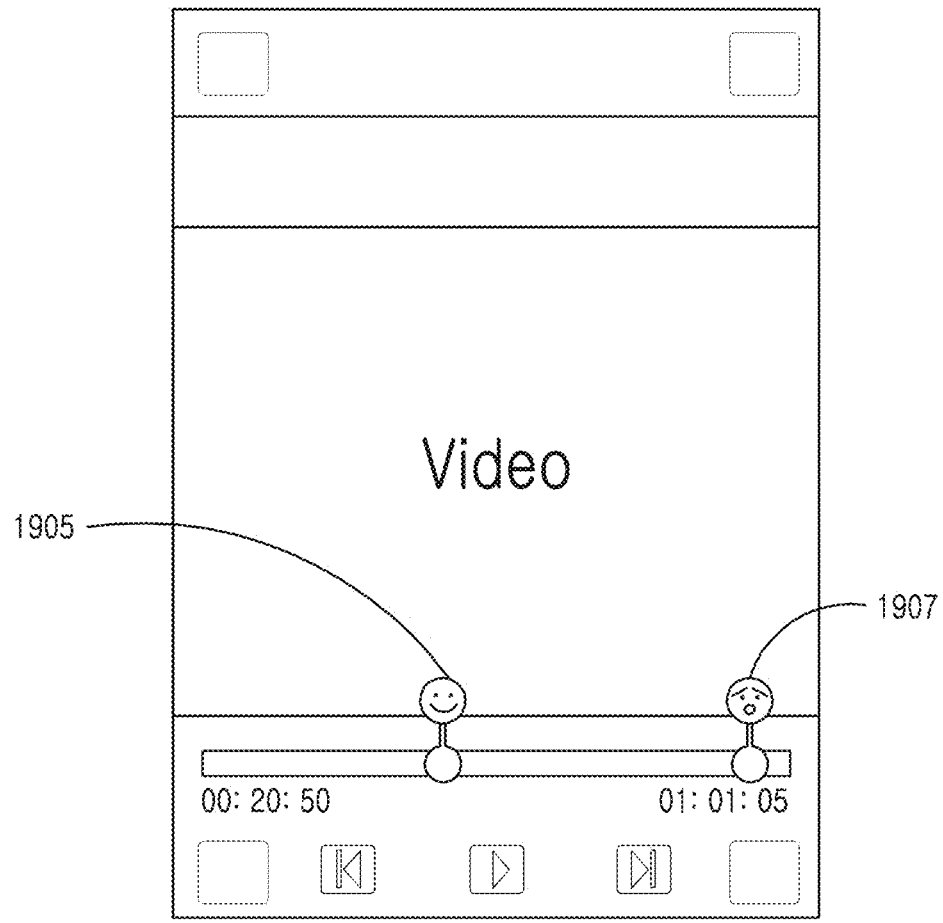

FIGS. 19A, 19B, and 19C are views illustrating screen configuration for displaying a moving picture with consideration of emotional information in an electronic device according to an embodiment of the present disclosure.

Referring to FIGS. 19A, 19B, and 19C, according to various embodiments of the present disclosure, the file management program 115 may control to display a thumbnail of a moving picture depending on emotional information included in the moving picture as illustrated in FIG. 19A.

FIGS. 22A and 22B are views illustrating screen configuration for displaying electronic book content with consideration of emotional information in an electronic device according to an embodiment of the present disclosure.

Referring to FIGS. 22A and 22B, according to various embodiments of the present disclosure, the file management program 115 may control to classify and display emotional information included in electronic book content using a structure window 2201 as illustrated in FIG. 22A.

The application 116 includes a software element for at least one application installed in the electronic device 100.

The processor unit 120 includes a memory interface 121, at least one processor 122, and a peripheral interface 124. According to various embodiments of the present disclosure, the memory interface 121, the at least one processor 122, and the peripheral interface 124 included in the processor unit 120 may be integrated in at least one integrated circuit, or implemented as separate elements.

The memory interface 121 controls a memory access of an element such as the processor 122 or the peripheral interface 124.

The peripheral interface 124 controls connection between an I/O peripheral of the electronic device 100, and the processor 122 and the memory interface 121.

The processor 122 controls the electronic device 100 to provide various multimedia services using at least one software program. The processor 122 executes at least one program stored in the memory 110 to provide a service corresponding to a relevant program. For example, the processor 122 may execute the emotion extract program 114 to add extracted user's emotional information to relevant content. As another example, the processor 122 may execute the file management program 115 to manage content depending on the user's emotional information.

The audio processor 130 provides an audio interface between the user and the electronic device 100 via a speaker 131 and a microphone 132.

The first camera unit 140 is positioned in the rear side of the electronic device 100 to provide a collected image to the processor unit 120 by capturing an object, and the second camera unit 150 is positioned in the front side of the electronic device 100 to provide a collected image to the processor unit 120 by capturing an object. For example, the first camera unit 140 and the second camera unit 150 may include a camera sensor for converting an optical signal to an electric signal, an image processor for converting an analog image signal to a digital image signal, and a signal processor for image-processing an image signal output from the image processor so that the image signal may be displayed on the display unit 170. According to various embodiments of the present disclosure, the camera sensor may be a Charged Coupled Device (CCD) or a Complementary Metal Oxide Semiconductor (CMOS) sensor, and the like. The signal processor may be implemented as a Digital Signal Processor (DSP).

The I/O controller 160 provides an interface between an I/O unit such as the display unit 170 and the input unit 180, and the peripheral interface 123.

The display unit 170 displays status information of the electronic device 100, a character input by the user, a moving picture, a still picture, and the like. For example, the display unit 170 displays information of an application driven by the processor 122. If an emotion display menu has been set, the display unit 170 may additionally display a user's emotional information for content displayed on the display unit 170 under control of the GUI program 113. For example, in the case in which the emotion display menu has been set when reproducing a moving picture, the display unit 170 may display emotional information 1801, 1803, and 1805 on a time search bar for the moving picture as illustrated in FIGS. 18B and 18C. As another example, if the emotion display menu has been set when providing an electronic book service, the display unit 170 may additionally display emotional information on electronic book content displayed on the display unit 170 as illustrated in FIG. 22B. As another example, if the emotion display menu has been set when providing a shopping service, the display unit 170 may additionally display emotional information on goods information.

The input unit 180 provides input data generated by the user's selection to the processor unit 120 via the I/O controller 160. At this point, the input unit 180 includes a keypad including at least one hardware button and a touchpad for detecting touch information. For example, the input unit 180 provides touch information detected via the touchpad to the processor 122 via the I/O controller 160.

Additionally, the electronic device 100 may include a communication system for performing a communication function for voice communication and data communication. The communication system may be divided to a plurality of sub-modules supporting different communication networks. For example, though not limited thereto, the communication network includes a Global System for Mobile communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless Local Area Network (LAN), a Bluetooth network, Near Field Communications (NFC), and/or the like.

Figure 2:
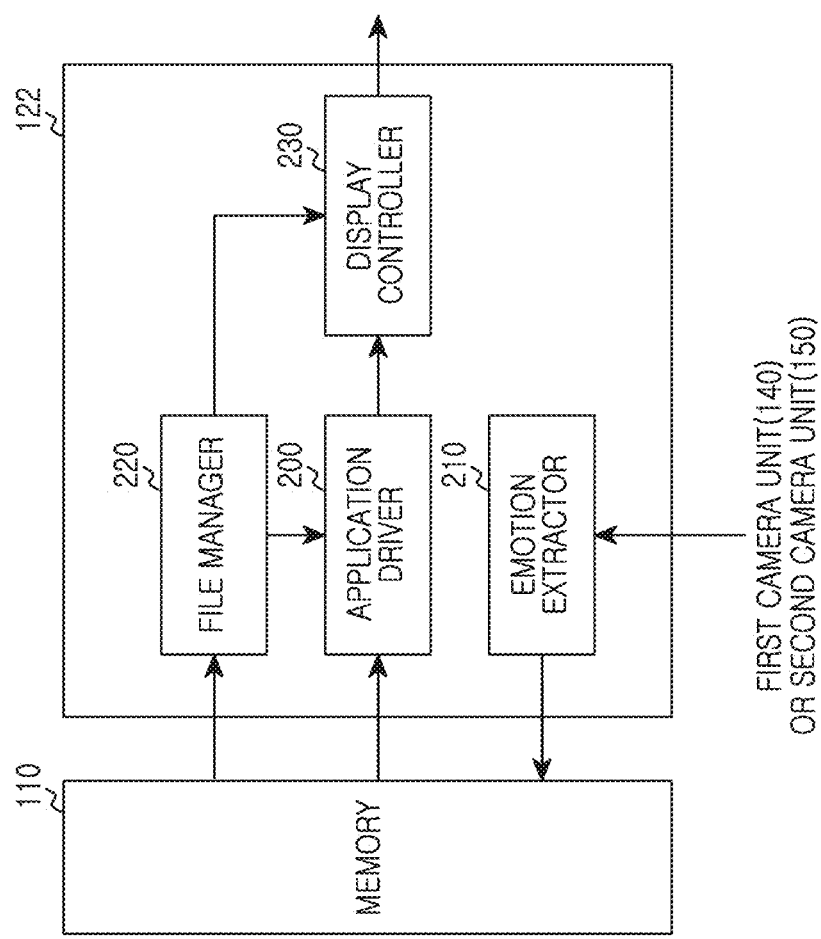
FIG. 2 is a detailed block diagram illustrating a processor according to an embodiment of the present disclosure.

FIG. 2 is a detailed block diagram illustrating a processor according to an embodiment of the present disclosure.

Referring to FIG. 2, the processor 122 includes an application driver 200, an emotion extractor 210, a file manager 220, and a display controller 230.

The application driver 200 executes at least one application 116 stored in the program storage 111 to provide a service corresponding to the relevant program. For example, the application driver 200 may execute an application stored in the program storage 111 to reproduce a moving picture. As another example, the application driver 200 may execute an application stored in the program storage 111 to capture a photo or a moving picture using the first camera unit 140 or the second camera unit 150. As another example, the application driver 200 may execute an application stored in the program storage 111 to provide an electronic book service. As another example, the application driver 200 may execute an application stored in the program storage 111 to provide a shopping service.

The emotion extractor 210 executes the emotion extract program 114 stored in the program storage 111 to extract a user's emotion. For example, the emotion extractor 210 estimates movements of a plurality of facial muscles for estimating emotional information from the user's facial image obtained via the first camera unit 140 or the second camera unit 150. After estimating movements of a plurality of facial muscles for estimating emotional information from a user's facial image, the emotion extractor 210 extracts the user's emotion with consideration of movement information of the facial muscles. If an emotion estimation value calculated with consideration of the movement information of the facial muscles exceeds a reference emotion value, the emotion extract program 114 may recognize that the emotion extract program 114 has extracted the user's emotion for relevant content.

According to various embodiments of the present disclosure, the emotion extractor 210 may selectively activate the first camera unit 140 or the second camera unit 150 for obtaining the user's image. For example, when taking a photograph using the first camera 140, the emotion extractor 210 activates the second camera unit 150. After activating the second camera unit 150, the emotion extractor 210 extracts the user's emotional information using a user image obtained via the second camera unit 150 at a point of capturing an image via the first camera unit 140.

As another example, when capturing a moving picture via the first camera unit 140, the emotion extractor 210 activates the second camera unit 150. After activating the second camera unit 150, the emotion extractor 210 may extract the user's emotional information using a user image obtained via the second camera unit 150 while capturing a moving picture using the first camera unit 140.

As another example, if a moving picture reproduction application is driven, the emotion extractor 210 activates the second camera unit 150. After activating the second camera unit 150, the emotion extractor 210 may extract the user's emotional information using a user image obtained via the second camera unit 150 while reproducing a moving picture.

As another example, when an electronic book service is being provided, the emotion extractor 210 activates the second camera unit 150. After activating the second camera unit 150, the emotion extractor 210 may extract the user's emotional information using a user image obtained via the second camera unit 150 while providing the electronic book service.

As another example, when a shopping service is being provided, the emotion extractor 210 activates the second camera unit 150. After activating the second camera unit 150, the emotion extractor 210 may extract the user's emotional information using a user image obtained via the second camera unit 150 at a point of determining purchasable goods information.

As another example, when a shopping service is provided, the emotion extractor 210 activates the second camera unit 150. After activating the second camera unit 150, the emotion extractor 210 may extract the user's emotional information using a user image obtained via the second camera unit 150 at a point of purchasing goods.

The emotion extractor 210 may execute the emotion extract program 114 to transmit extracted user's emotional information to the memory 110. The memory 110 may map the user's emotional information to relevant content and store the same.

The file manager 220 may execute the file management program 115 stored in the program storage 111 to manage each content depending on emotional information of content. Specifically, the file manager 220 may retrieve, classify, and reproduce each content using emotional information of content stored in the data storage 112. For example, the file manager 220 may control to classify and display photo content stored in the data storage 112 according to emotional information as illustrated in FIG. 15B or 15C. As another example, the file manager 220 may control to display a thumbnail of a moving picture depending on emotional information included in the moving picture as illustrated in FIG. 19A. As another example, the file manager 220 may control to classify and display emotional information included in electronic book content using the structure window 2201 as illustrated in FIG. 22A.

The display controller 230 controls to execute the GUI program 113 stored in the program storage 111 to display a user interface on the display unit 170 using graphics. For example, the display controller 230 controls to display information of an application driven by the application driver 200 on the display unit 170. If the emotion display menu has been set, the display controller 230 may control to display the user's emotional information for content displayed on the display unit 170. For example, if the emotion display menu has been set while reproducing a moving picture, the display controller 230 may control to display emotional information 1801, 1803, and 1805 on a time search bar of the moving picture as illustrated in FIG. 18B or 18C. As another example, if the emotion display menu has been set when providing an electronic book service, the display controller 230 may control to additionally display emotional information on electronic book content displayed on the display unit 170 as illustrated in FIG. 22B. As another example, in the case in which the emotion display menu has been set when providing a shopping service, the display controller 230 may control to additionally display emotional information on goods information.

In the above various embodiments of the present disclosure, the electronic device 100 may add the user's emotional information to content and manage the content depending on the user's emotion using the processor 122 including the emotion extractor 210 and the file manager 220.

According to various embodiments of the present disclosure, the electronic device 100 may include a separate control module for adding the user's emotional information to content, and managing the content depending on the user's emotion.

Figure 3:
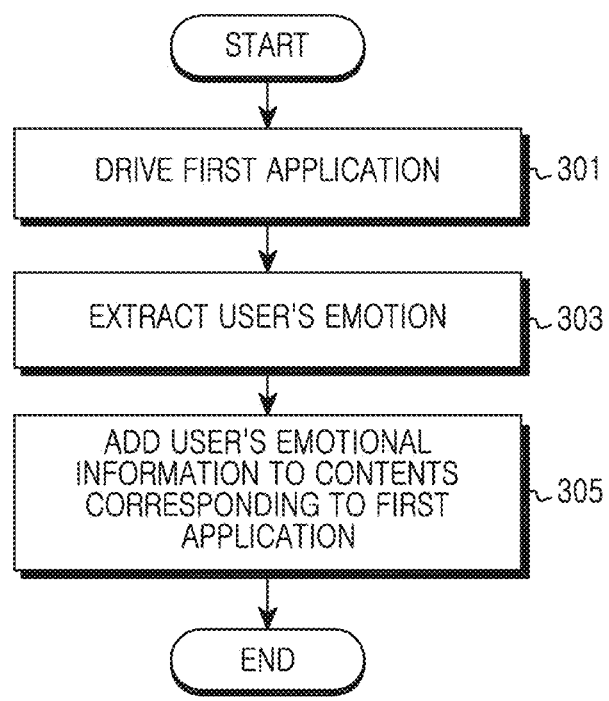
FIG. 3 is a flowchart illustrating a procedure for adding a user's emotional information to content in an electronic device according to an embodiment of the present disclosure.

FIG. 3 is a flowchart illustrating a procedure for adding a user's emotional information to content in an electronic device according to an embodiment of the present disclosure.

Referring to FIG. 3, at operation 301, the electronic device drives a first application to provide a service. For example, the electronic device may drive a camera application to provide a photographing service or a moving picture capturing service using the first camera unit 140 or the second camera unit 150. As another example, the electronic device may drive a moving picture reproduction application to reproduce a moving picture. As another example, the electronic device may drive an electronic book application to provide an electronic book service. As another example, the electronic device may drive a mobile shopping application to provide a mobile shopping service.

At operation 303, electronic device extracts emotional information of a user who uses a service corresponding to a first application using a user image provided via at least one camera. For example, when providing a photographing service or a moving picture capturing service via the first camera unit 140, the electronic device may activate the second camera unit 150 to extract emotional information from an obtained user image. As another example, when reproducing a moving picture, the electronic device may activate the second camera unit 150 to extract emotional information from an obtained user image. As another example, when providing an electronic book service, the electronic device may activate the second camera unit 150 to extract emotional information from an obtained user image. As another example, when providing a shopping service, the electronic device may activate the second camera unit 150 to extract emotional information from an obtained user image.

After extracting the user's emotional information at operation 303, at operation 305, the electronic device adds the user's emotional information to content corresponding to a first application and stores the same. For example, the electronic device may add an emotional tag corresponding to the user's emotional information to content corresponding to a first application and store the same. As another example, the electronic device may generate and store metadata including the user's emotional information for content corresponding to the first application.

Figure 4:
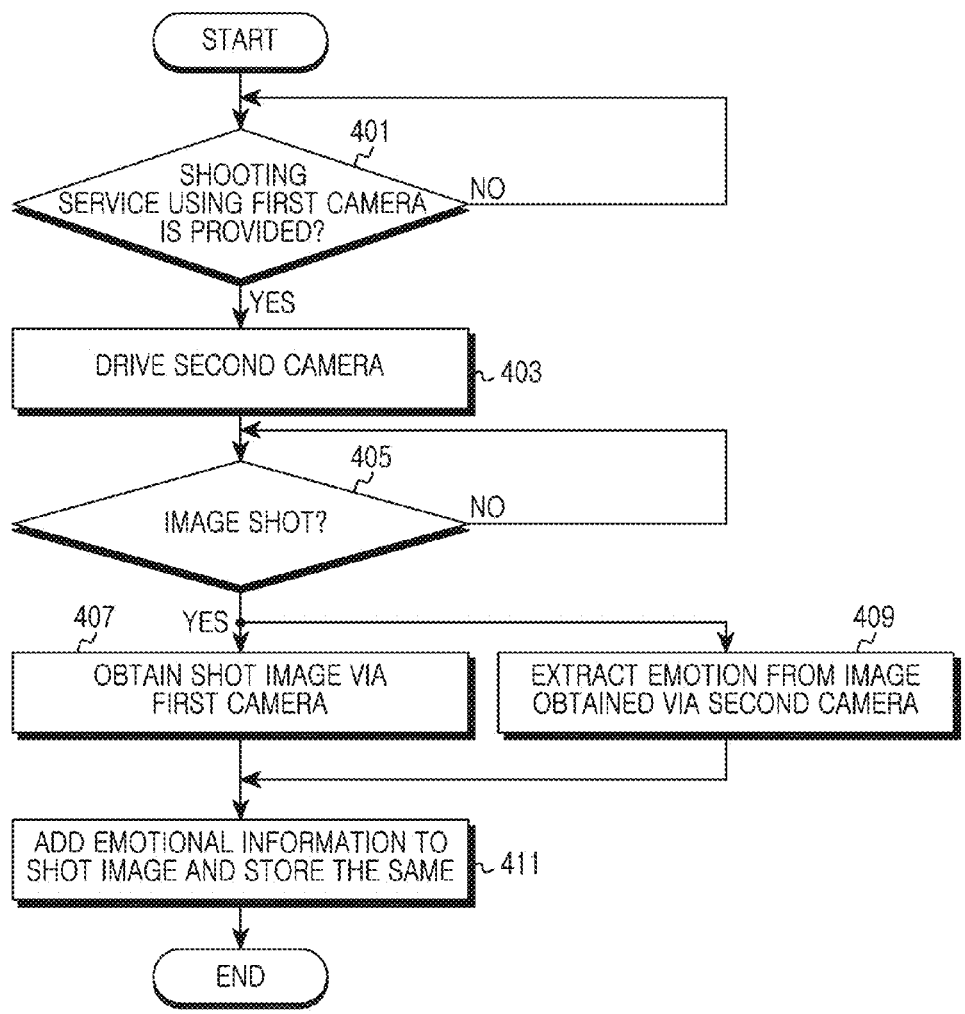
FIG. 4 is a flowchart illustrating a procedure for adding a user's emotional information to a shot image in an electronic device according to an embodiment of the present disclosure.

FIG. 4 is a flowchart a procedure for adding a user's emotional information to a shot image in an electronic device according to an embodiment of the present disclosure.

Referring to FIG. 4, at operation 401, the electronic device determines whether an image capturing service using the first camera unit 140 is provided. For example, the electronic device determines whether an image capturing event using the first camera 140 occurs depending on touch information provided via the input unit 180.

If the electronic device determines that the image capturing service using the first camera unit 140 is not being provided at operation 401, then the electronic continues to poll for an indication that the image capturing service using the first camera unit 140 is provided.

If the electronic device determines that the image capturing service using the first camera unit 140 is being provided at operation 401, then the electronic device proceeds to operation 403 at which the electronic device drives the second camera unit 150.

FIGS. 5A, 5B, 5C, and 5D are views illustrating screen configuration for adding a user's emotional information to a shot image in an electronic device according to an embodiment of the present disclosure.

Figure 5A:
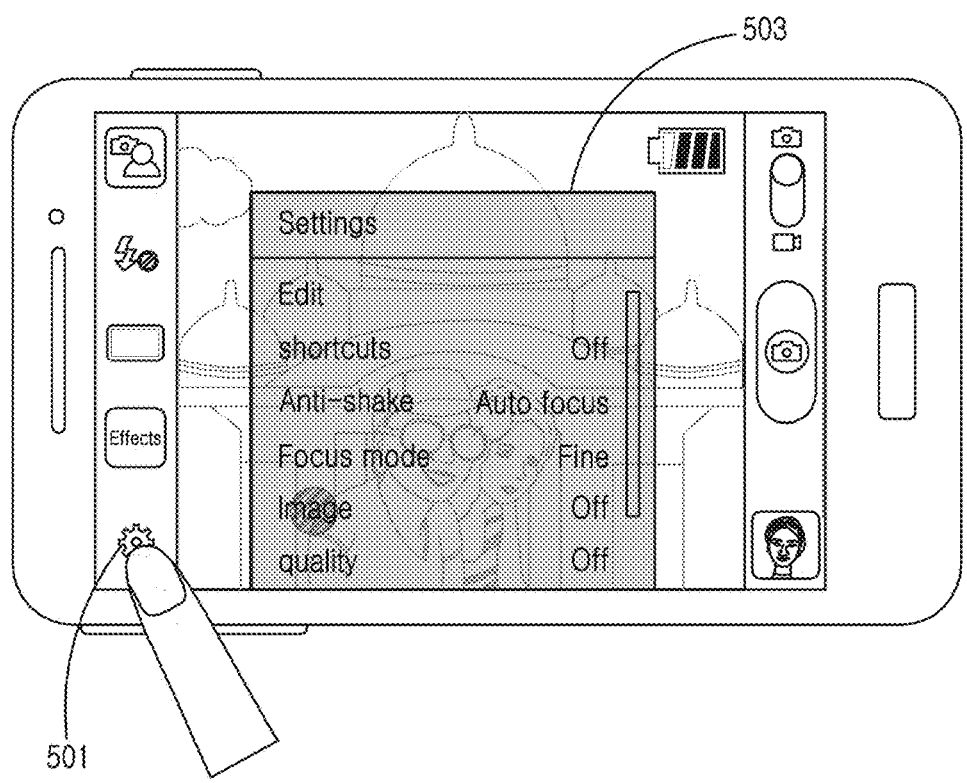
FIGS. 5A, 5B, 5C, and 5D are views illustrating screen configuration for adding a user's emotional information to a shot image in an electronic device according to an embodiment of the present disclosure.
Figure 5B:
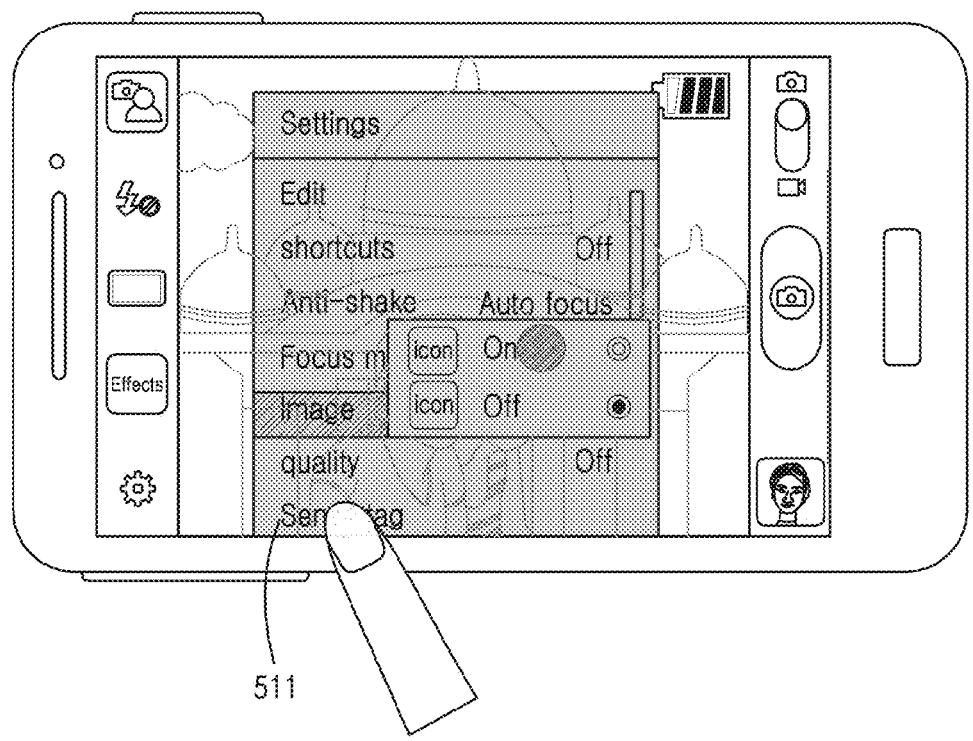
Figure 5C:
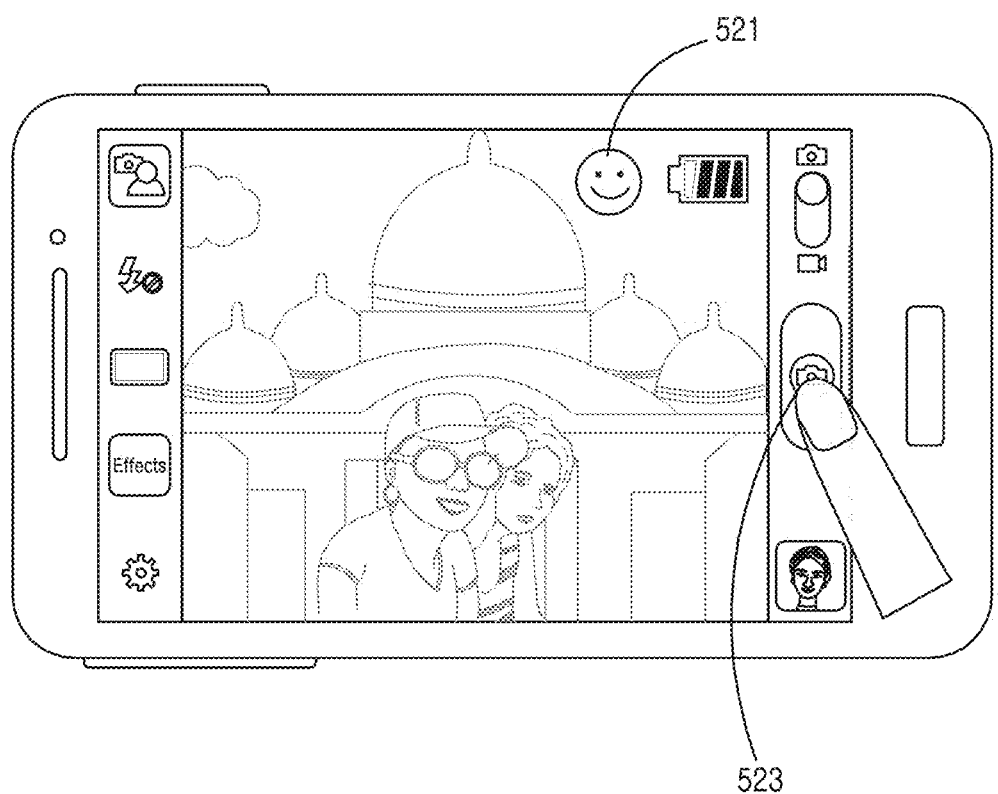

Referring to FIGS. 5A, 5B, 5C, and 5D, the emotion display menu has been set as illustrated in FIGS. 5A and 5B, in order to obtain an image of a user, the electronic device activates the second camera unit 150 positioned in the direction opposite to the first camera unit 140 that shoots an object when capturing an object. For example, when a capturing service using the first camera unit 140 is provided, the electronic device displays a preview screen obtained via the first camera unit 140 on the display unit 170 as illustrated in FIG. 5A. When detecting selection of a set icon 501 included in the preview screen, the electronic device displays a setting menu 503. After displaying the setting menu 503, when detecting selection of an emotion display menu (sense tag) 511 in the setting menu 503 as illustrated in FIG. 5B, the electronic device recognizes the emotion display menu has been set. Accordingly, as illustrated in FIG. 5C, the electronic device may display a user's emotional information 521 extracted by the second camera unit 150 on the preview screen obtained via the first camera unit 140.

At operation 405, the electronic device determines whether an image capturing event occurs. For example, the electronic device determines whether selection of a capturing icon 523 is detected.

If the electronic device determines that the image capturing event does not occur at operation 405, then the electronic device continue to poll for an indication that the image capturing event occurs.

If the electronic device determines that the image capturing event occurs at operation 405, then the electronic device proceeds to operation 407 at which the electronic device obtains a capturing image via the first camera unit 140.

In addition, if the electronic device determines that the image capturing event occurs at operation 405, then the electronic device may also proceeds to operation 409 at which the electronic device extracts the user's emotional information from a user image obtained via the second camera unit 150 at a point at which an image capturing event has occurred. For example, the electronic device estimates movements of a plurality of facial muscles for estimating emotional information from the user's facial image obtained via the second camera unit 150. After extracting the user's emotional information from the user image, the electronic device extracts the user's emotion with consideration of the movement information of the facial muscles. If an emotion estimation value calculated with consideration of the movement information of the facial muscles exceeds a reference emotional value, the electronic device may recognize that the electronic device has extracted the user's emotion for the relevant shot image.

Figure 5D:
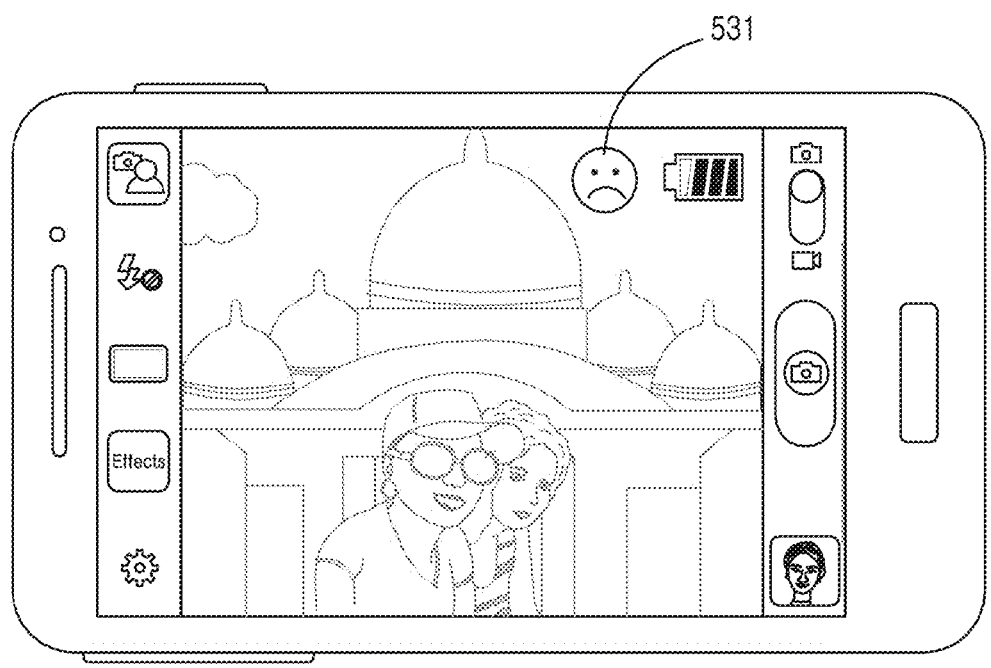

After extracting the captured image and the user's emotional information at operations 407 and 409, respectively, the electronic device proceeds to operation 411 at which the electronic device adds the user's emotional information extracted when obtaining the shot image to the shot image and stores the same. For example, the electronic device may add an emotional tag corresponding to the user's emotional information to a shot image, or generate metadata including the user's emotional information for a shot image to store the user's emotional information for the shot image. As illustrated in FIG. 5D, the electronic device displays the shot image on the display unit 170. For example, when obtaining the shot image, the electronic device may display the user's emotional information 531 on a partial region of the display unit 170.

In the above various embodiments of the present disclosure, when a capturing service using the first camera unit 140 of the electronic device is provided, the electronic device may extract the user's emotional information using a user image obtained via the second camera unit 150.

According to various embodiments of the present disclosure, in case of providing a capturing service using the second camera unit 150 of the electronic device, the electronic device may extract the user's emotional information using a user image obtained via the first camera unit 140.

Figure 6:
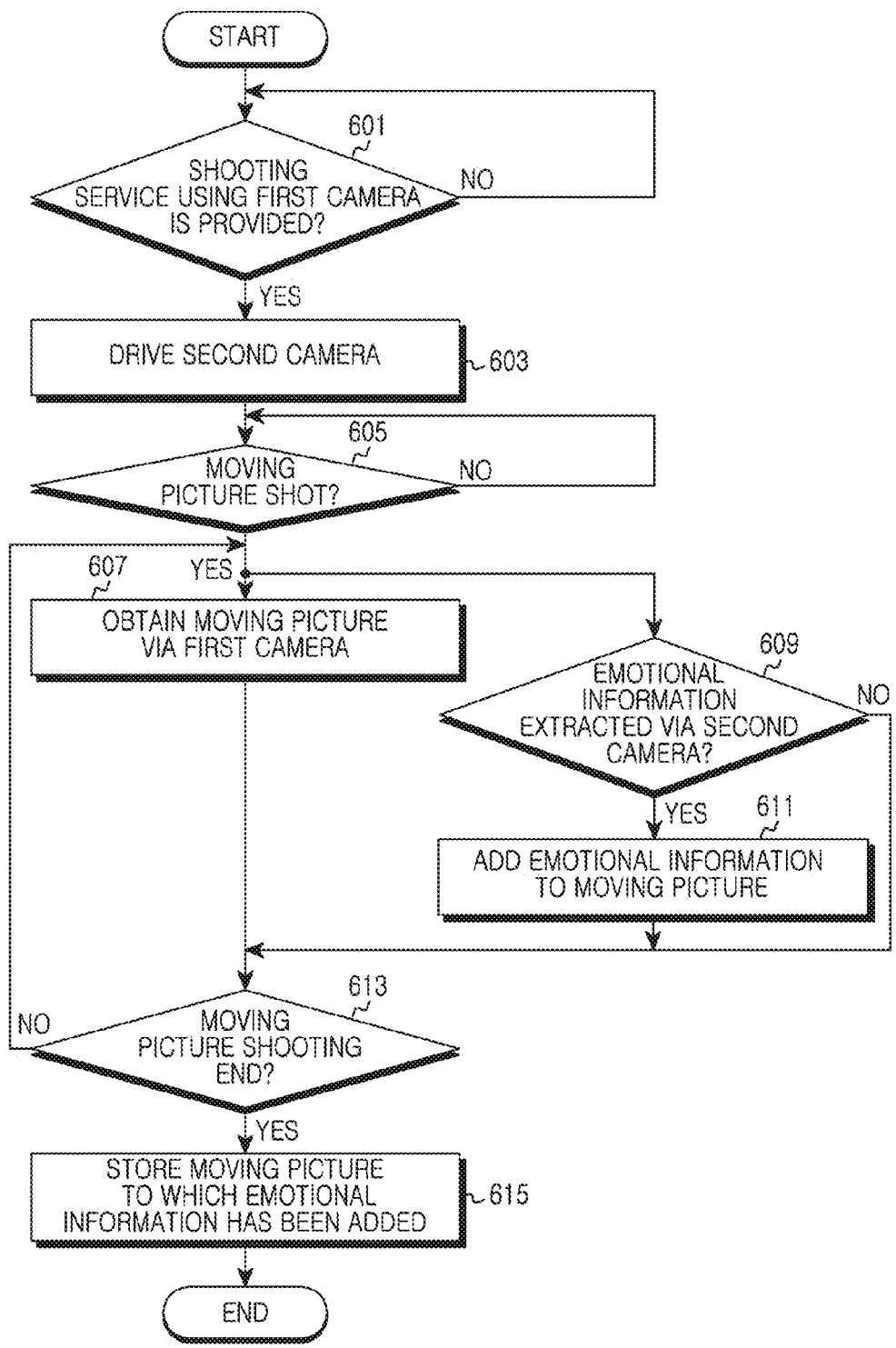
FIG. 6 is a flowchart illustrating a procedure for adding a user's emotional information to a moving picture in an electronic device according to an embodiment of the present disclosure.

FIG. 6 is a flowchart illustrating a procedure for adding a user's emotional information to a moving picture in an electronic device according to an embodiment of the present disclosure.

Referring to FIG. 6, at operation 601, the electronic device determines whether a moving picture capturing service using the first camera unit 140 is provided. For example, the electronic device determines whether a moving picture capturing event using the first camera unit 140 occurs depending on touch information provided via the input unit 180.

If the electronic device determines that the moving picture capturing service using the first camera unit 140 is not being provided at operation 601, then the electronic continues to poll for an indication that the moving picture capturing service using the first camera unit 140 is provided.

If the electronic device determines that the moving picture capturing service using the first camera unit 140 is provided at operation 601, then the electronic device proceeds to operation 603 at which the electronic device drives the second camera unit 150. For example, if the emotion display menu has been set, in order to obtain a user's image, the electronic device activates the second camera unit 150 positioned in the direction opposite to the first camera unit 140 capturing a moving picture when capturing a moving picture. For example, if a moving picture capturing service using the first camera unit 140 is being provided, the electronic device displays a preview screen obtained via the first camera unit 140 on the display unit 170. If selection of a setting icon included in the preview screen is detected, the electronic device displays a setting menu. When the electronic device detects selection of the emotion display menu in the setting menu, the electronic device recognizes the emotion display menu has been set.

At operation 605, the electronic device determines whether a moving picture capturing event occurs. For example, the electronic device determines whether selection of a capturing icon displayed on the preview screen is detected.

If the electronic device determines that a moving picture capturing event does not occur at operation 605, then the electronic device may continue to poll for an indication that a moving picture capturing event occurs.

If the electronic device determines that a moving picture capturing event occurs at operation 605, then the electronic device proceed to operation 607 at which the electronic device obtains a moving picture via the first camera unit 140.

Thereafter, the electronic device may proceed to operation 613 at which the electronic device determines whether the moving picture capturing ends.

the electronic device determines that a moving picture capturing event occurs in operation 605, then the electronic device may also proceed to operation 609 at which the electronic device determines whether the user's emotional information is extracted from a user image obtained via the second camera unit 150 while the moving picture is shot. For example, the electronic device estimates movements of a plurality of facial muscles for estimating emotional information from the user's facial image obtained via the second camera unit 150. After estimating movements of a plurality of facial muscles for estimating emotional information from the user's facial image, the electronic device extracts the user's emotion with consideration of movement information of the facial muscles. At this point, when an emotion estimation value calculated with consideration of the movement information of the facial muscles exceeds a reference emotional value, the electronic device may recognize the electronic device has extracted the user's emotion from a frame of the capturing point of the relevant moving picture.

If the electronic device determines that the user's emotional information has not been extracted at operation 609, then the electronic device proceeds to operation 613 at which the electronic device determines whether the moving picture capturing ends.

In contrast, if the electronic device determines that the emotional information of the user is extracted at operation 609, then the electronic device proceeds to operation 611 at which the electronic device adds the user's emotional information obtained while capturing a moving picture to the moving picture. The electronic device adds the user's emotional information to the moving picture so that a point of extracting the user's emotional information is displayed.

Figure 9A:
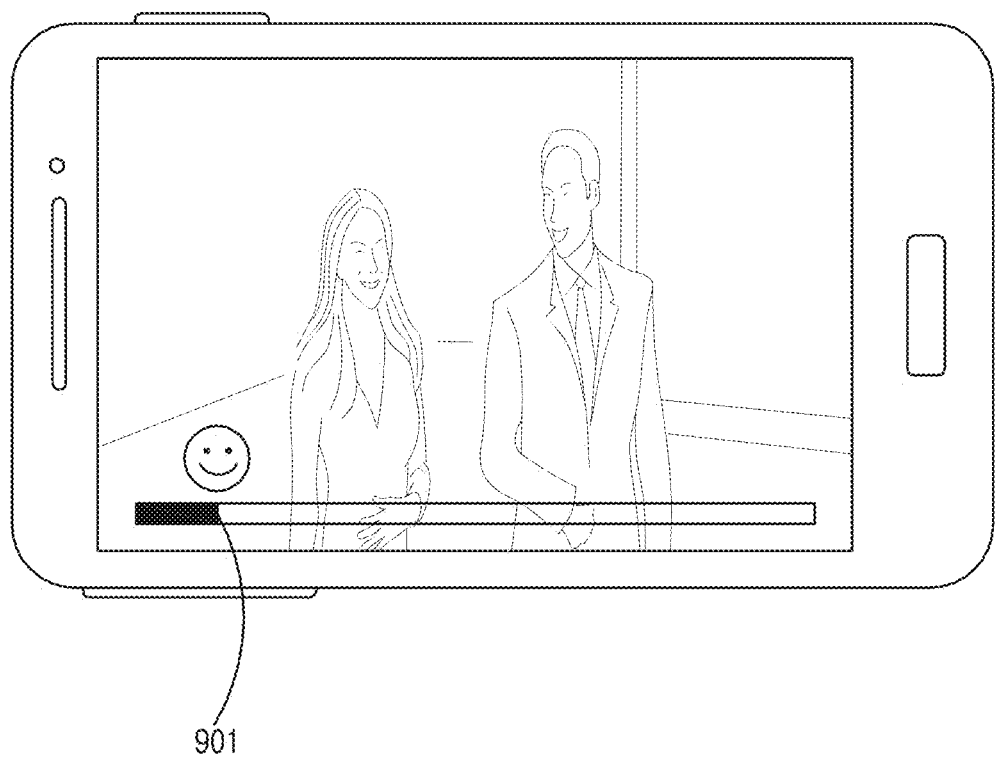
FIGS. 9A, 9B, and 9C are views illustrating screen configuration for adding a user's emotional information to a moving picture in an electronic device according to an embodiment of the present disclosure.
Figure 9B:
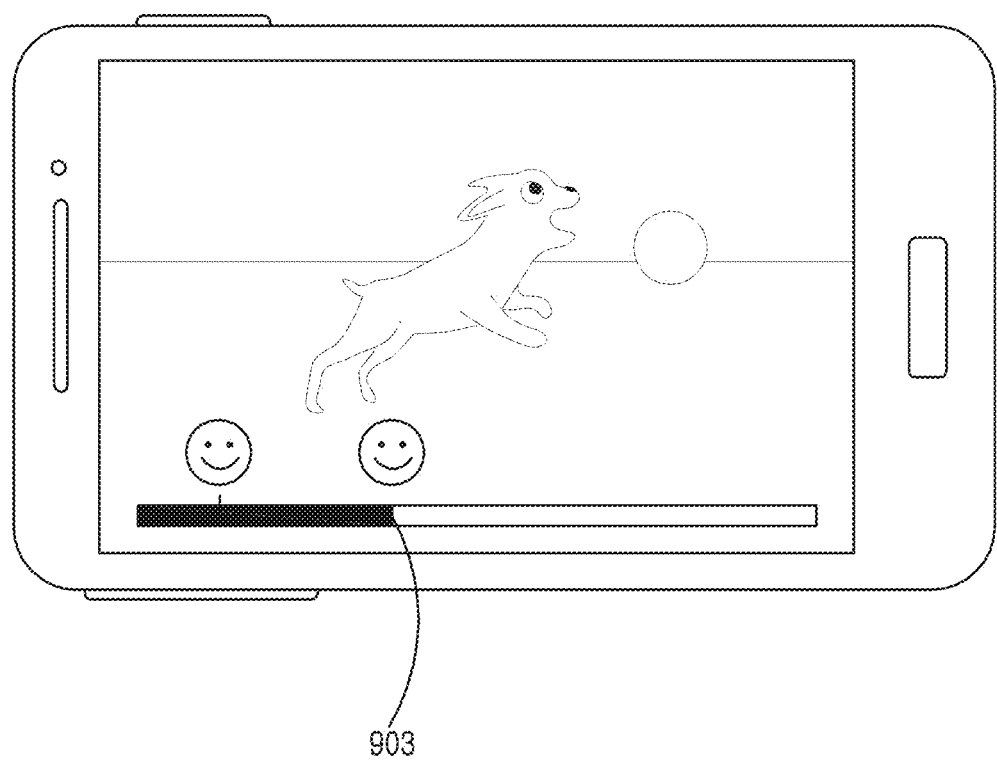
Figure 9C:
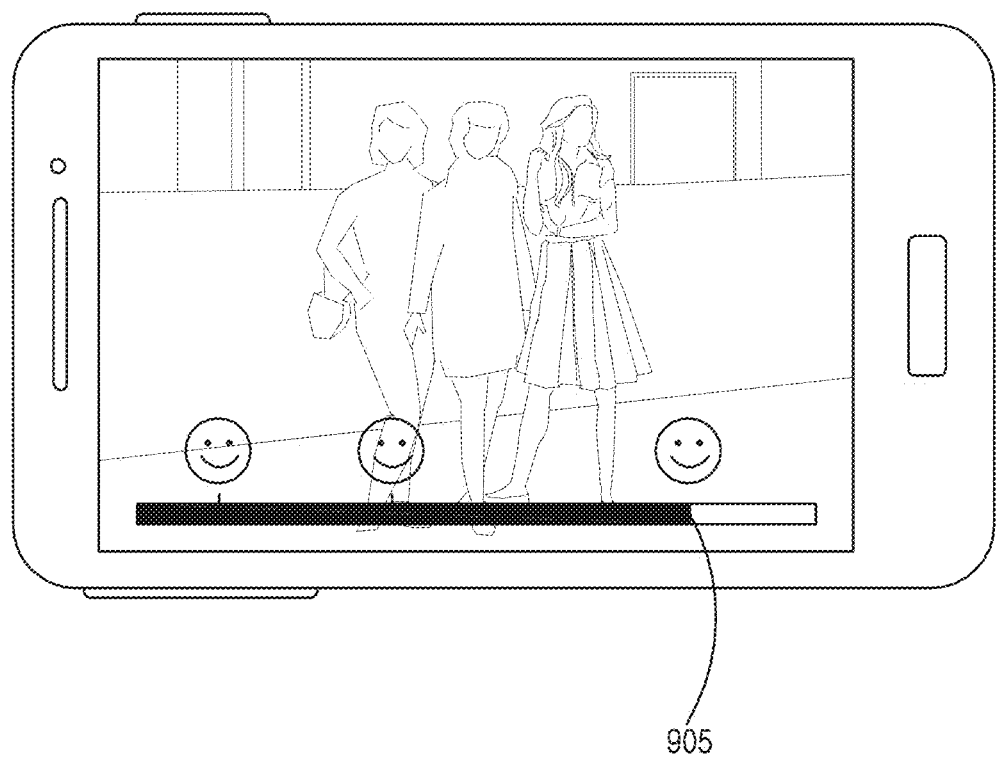

FIGS. 9A, 9B, and 9C are views illustrating screen configuration for adding a user's emotional information to a moving picture in an electronic device according to an embodiment of the present disclosure.

Referring to FIGS. 9A, 9B, and 9C, the electronic device adds the user's emotional information 901 to a time search bar of the moving picture of the point of extracting the user's emotional information as illustrated in FIG. 9A. After adding the user's emotional information 901 to the time search bar, if the user's emotional information is extracted again, the electronic device may add the user's emotional information 903 and 905 to the time search bar of the moving picture of the point of extracting the user's emotional information as illustrated in FIGS. 9B and 9C. According to various embodiments of the present disclosure, the electronic device may constantly display the previously added user's emotional information on the time search bar as illustrated in FIGS. 9B and 9C.

At operation 613, the electronic device determines whether the moving picture capturing ends.

If the electronic device determines that the moving picture capturing does not end at operation 613, then the electronic device proceeds to operation 607 at which the electronic device obtains a moving picture via the first camera unit 140.

In addition, if the electronic device determines that the moving picture capturing does not end at operation 613, then the electronic device also proceeds to operation 609 at which the electronic device determines whether the user's emotional information is extracted from a user image obtained via the second camera unit 150 while the moving picture is captured.

In contrast, if the electronic device determines that the moving picture capturing ends at operation 613, then the electronic device proceeds to operation 615 at which the electronic device stores the moving picture to which the emotional information has been added. For example, the electronic device may add an emotional tag corresponding to the user's emotional information to a frame of a point of extracting the user's emotional information among frames forming the moving picture, and store the same. As another example, the electronic device may generate metadata including the user's emotional information obtained during moving picture capture, and store the same together with the moving picture. According to various embodiments of the present disclosure, the metadata including the user's emotional information includes information of a point of extracting the user's emotional information during moving picture capture together.

In the above various embodiments of the present disclosure, the electronic device may add the user's emotional information to a time search bar of the moving picture every point of extracting the user's emotional information.

According to various embodiments of the present disclosure, the electronic device may add the user's emotional information to the time search bar of the moving picture at a point at which the user's emotional information has changed. For example, in case of extracting the user's emotion of happiness at a first point of the moving picture and then extracting the user's emotion of happiness also at a second point, the electronic device may add only information of the user's emotion of happiness at the first point to the time search bar of the moving picture.

Figure 7:
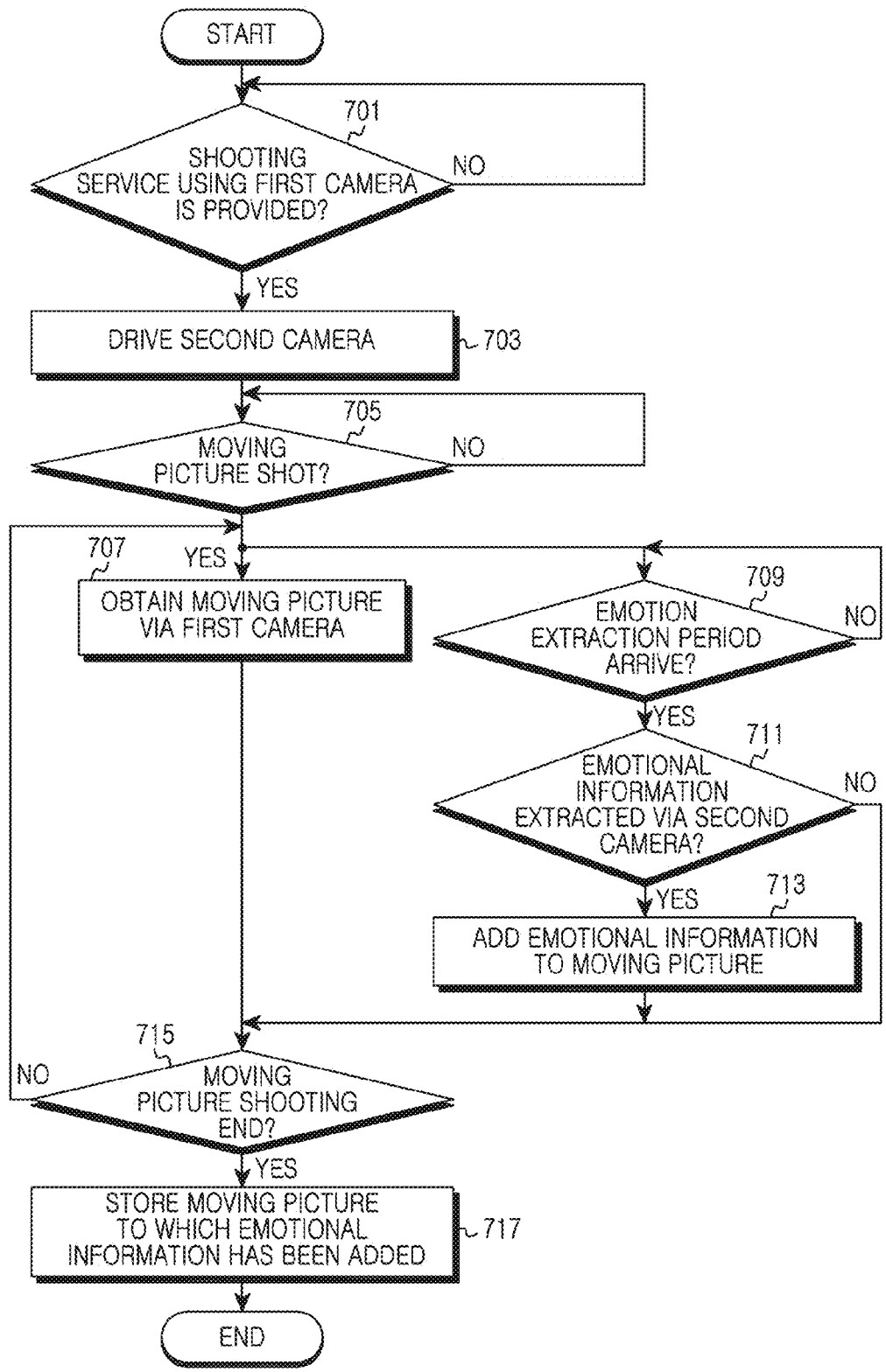
FIG. 7 is a flowchart illustrating a procedure for adding a user's emotional information to a moving picture in an electronic device according to an embodiment of the present disclosure.

FIG. 7 is a flowchart illustrating a procedure for adding a user's emotional information to a moving picture in an electronic device according to another embodiment of the present disclosure.

Referring to FIG. 7, at operation 701, the electronic device determines whether a moving picture capturing service using the first camera unit 140 is provided. For example, the electronic device determines whether a moving picture capturing event using the first camera unit 140 occurs depending on touch information provided via the input unit 180.

If the electronic device determines that the moving picture capturing service using the first camera unit 140 is not being provided at operation 701, then the electronic continues to poll for an indication that the moving picture capturing service using the first camera unit 140 is provided.

If the electronic device determines that the moving picture capturing service using the first camera unit 140 is being provided at operation 701, then the electronic device proceeds to operation 703 at which the electronic device drives the second camera unit 150. For example, if the emotion display menu has been set, in order to obtain a user's image, the electronic device activates the second camera unit 150 positioned in the direction opposite to the first camera unit 140 capturing a moving picture when capturing a moving picture.

At operation 705, the electronic device determines whether a moving picture capturing event occurs. For example, the electronic device determines whether selection of a capturing icon displayed on the preview screen is detected.

If the electronic device determines that the moving picture capturing event occurs at operation 705, then the electronic device proceeds to operation 707 at which the electronic device obtains a moving picture via the first camera unit 140.

At operation 715, the electronic device determines whether the moving picture capturing ends at operation 715.

In addition, if the electronic device determines that the moving picture capturing event occurs at operation 705, then the electronic device also proceeds to operation 709 at which the electronic device determines whether an emotion extraction period arrives. According to various embodiments of the present disclosure, the emotion extraction period may change depending on the user's input information.

If the electronic device determines that an emotion extraction period does not arrive at operation 709, then the electronic device may continue to poll for an indication that the emotion extraction period arrives.

If the electronic device determines that the emotion extraction period arrives at operation 709, then the electronic device proceeds to operation 711 at which the electronic device determines whether the user's emotional information is extracted from a user image obtained via the second camera unit 150. For example, the electronic device estimates movement of a plurality of facial muscles for estimating emotional information from the user's facial image obtained via the second camera unit 150. After estimating movement of a plurality of facial muscles for estimating emotional information from the user's facial image, the electronic device extracts the user's emotion with consideration of movement information of the facial muscles. If an emotion estimation value calculated with consideration of the movement information of the facial muscles exceeds a reference emotional value, the electronic device may recognize that the electronic device has extracted the user's emotion for a frame of a point of capturing a relevant moving picture.

If the electronic device determines that the user's emotional information is not extracted from a user image obtained via the second camera unit 150 at operation 711, then the electronic device proceeds to operation 715 at which the electronic device determines whether moving picture capturing ends.

In contrast, if the electronic device determines that the user's emotional information is extracted from a user image obtained via the second camera unit 150 at operation 711, then the electronic device proceeds to operation 713 at which the electronic device adds the user's emotional information to the moving picture. The electronic device adds the user's emotional information to the moving picture so that a point of extracting the user's emotional information is displayed. For example, the electronic device adds the user's emotional information to a time search bar of the point of extracting the user's emotional information of the moving picture as illustrated in FIG. 9A. After adding the user's emotional information to a time search bar of the point of extracting the user's emotional information of the moving picture, when extracting the user's emotional information again, the electronic device may add the user's emotional information to a time search bar of a point of extracting the user's emotional information of the moving picture as illustrated in FIGS. 9B and 9C. According to various embodiments of the present disclosure, the electronic device may constantly display the previously added user's emotional information to the time search bar as illustrated in FIGS. 9B and 9C.

At operation 715, the electronic device determines whether moving picture capturing ends.

If the electronic device determines that the moving picture capturing does not end at operation 715, then the electronic device proceeds to operation 707 at which the electronic device obtains a moving picture via the first camera unit 140.

In addition, if the electronic device determines that the moving picture capturing does not end at operation 715, then the electronic device may also proceed to operation 709 at which the electronic device determines whether an emotion extract period arrives.

If the electronic device determines that the moving picture capturing ends at operation 715, then the electronic device proceeds to operation 717 at which the electronic device stores the moving picture to which emotional information has been added. For example, the electronic device may add an emotional tag corresponding to the user's emotional information to a frame of a point of extracting the user's emotional information among frames forming the moving picture, and store the same. As another example, the electronic device may generate metadata including the user's emotional information obtained during moving picture capturing, and store the same together with the moving picture. According to various embodiments of the present disclosure, the metadata including the user's emotional information includes information of a point of extracting the user's emotional information during the moving picture capturing together.

According to the above various embodiments of the present disclosure, the electronic device may add the user's emotional information to the time search bar of the moving picture every point of extracting the user's emotional information.

According to various embodiments of the present disclosure, the electronic device may add the user's emotional information to the time search bar of the moving picture at a point at which the user's emotional information has changed. For example, if the user's emotion of happiness at a first emotion extraction period of the moving picture is extracted and then the user's emotion of happiness at a second emotion extraction period is extracted, the electronic device may add only the user's emotional information extracted at the first emotion extraction period to the time search bar of the moving picture.

According to the above various embodiments of the present disclosure, if a moving picture capturing service using the first camera unit 140 of the electronic device is being provided, the electronic device may extract the user's emotional information from a user image obtained via the second camera unit 150.

According to various embodiments of the present disclosure, if a moving picture capturing service using the second camera unit 150 of the electronic device is being provided, the electronic device may extract the user's emotional information from a user image obtained via the first camera unit 140.

Figure 8:
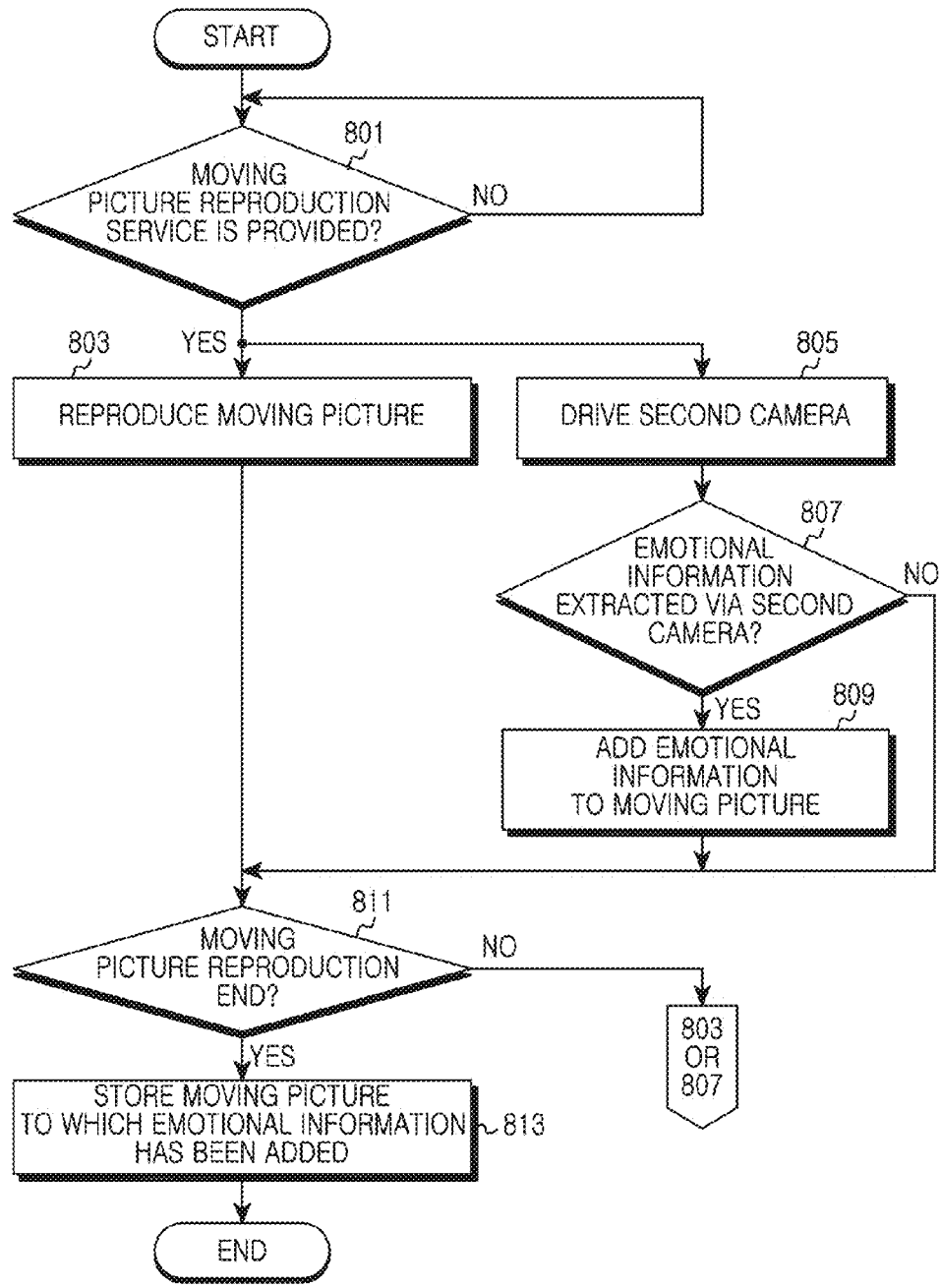
FIG. 8 is a flowchart illustrating a procedure for adding a user's emotional information to a moving picture in an electronic device according to an embodiment of the present disclosure.

FIG. 8 illustrates a procedure for adding a user's emotional information to a moving picture in an electronic device according to an embodiment of the present disclosure.

Referring to FIG. 8, at operation 801, the electronic device determines whether a moving picture reproduction service is provided. For example, the electronic device determines whether one of one or more moving picture files stored in the data storage 112 is selected depending on touch information provided via the input unit 180.

If the electronic device determines that the moving picture reproduction service is not being provided at operation 801, then the electronic device may continue to poll for an indication that the moving picture reproduction service is being provided.

If the electronic device determines that the moving picture reproduction service is being provided at operation 801, then the electronic device proceeds to operation 803 at which the electronic device reproduces a moving picture selected for the moving picture reproduction service. For example, the electronic device displays the reproduced moving picture on the display unit 170.

Thereafter, the electronic device proceeds to operation 811 at which the electronic device determines whether the moving picture reproduction ends.

In addition, if the electronic device determines that the moving picture reproduction service is being provided at operation 801, then the electronic device may also proceed to operation 805 at which the electronic device drives the second camera unit 150. For example, in the case in which the emotion display menu has been set, the electronic device activates the second camera unit 150 positioned in the same direction as the display unit 170 for displaying the moving picture being reproduced in order to obtain the user's image while reproducing the moving picture. Thereafter, the electronic device proceeds to operation 807.

At operation 807, the electronic device determines whether the user's emotional information is extracted from the user image obtained via the second camera unit 150. For example, the electronic device estimates movements of a plurality of facial muscles for estimating emotional information from the user's facial image obtained via the second camera unit 150. After estimating movements of a plurality of facial muscles for estimating emotional information from the user's facial image, the electronic device extracts the user's emotion with consideration of the movement information of the facial muscles. If an emotion estimation value calculated with consideration of the movement information of the facial muscles exceeds a reference emotion value, the electronic device may recognize that the electronic device has extracted the user's emotion for a frame of a point of capturing the relevant moving picture.

If the electronic device determines that the user's emotional information is not extracted at operation 807, then the electronic device proceeds to operation 811 at which the electronic device determines whether the moving picture reproduction ends.

If the electronic device determines that the user's emotional information is extracted at operation 807, then the electronic device proceeds to operation 809 at which the electronic device adds the user's emotional information to the moving picture. The electronic device adds the user's emotional information to the moving picture so that a point of extracting the user's emotional information is displayed. For example, the electronic device adds the user's emotional information to a time search bar of a point of extracting the user's emotional information of the moving picture as illustrated in FIG. 9A. After adding the user's emotional information to a time search bar of a point of extracting the user's emotional information of the moving picture, if the user's emotional information is extracted again, the electronic device may add the user's emotional information to the time search bar of the point of extracting the user's emotional information of the moving picture as illustrated in FIGS. 9B and 9C. According to various embodiments of the present disclosure, the electronic device may constantly display the previously added user's emotional information to the time search bar as illustrated in FIGS. 9B and 9C.

At operation 811, the electronic device determines whether the moving picture reproduction ends.

If the electronic device determines that the moving picture reproduction does not end at operation 811, then the electronic device proceeds to operation 803 at which the electronic device reproduces the moving picture selected for the moving picture reproduction service.

In addition, if the electronic device determines that the moving picture reproduction does not end at operation 811, then the electronic device may also proceed to operation 807 at which the electronic device determines whether the user's emotional information is extracted.

If the electronic device determines that the moving picture reproduction ends at operation 811, then the electronic device proceeds to operation 813 at which the electronic device stores the moving picture to which the emotional information has been added. For example, the electronic device may add an emotional tag corresponding to the user's emotional information to a frame of a point of extracting the user's emotional information among frames forming the moving picture, and store the same. As another example, the electronic device may generate metadata including the user's emotional information obtained during moving picture capturing, and store the same together with the moving picture. According to various embodiments of the present disclosure, the metadata including the user's emotional information includes information of a point of extracting the user's emotional information during moving picture capturing together.

According to the above various embodiments of the present disclosure, the electronic device may add the user's emotional information to a time search bar of the moving picture every point of extracting the user's emotional information.

According to various embodiments of the present disclosure, the electronic device may add the user's emotional information to the time search bar of the moving picture at a point at which the user's emotional information has changed. For example, if the user's emotion of happiness at a first point of the moving picture is extracted and then the user's emotion of happiness at a second point is extracted, the electronic device may add only information of the user's emotion of happiness extracted at the first point to the time search bar of the moving picture.

Figure 10:
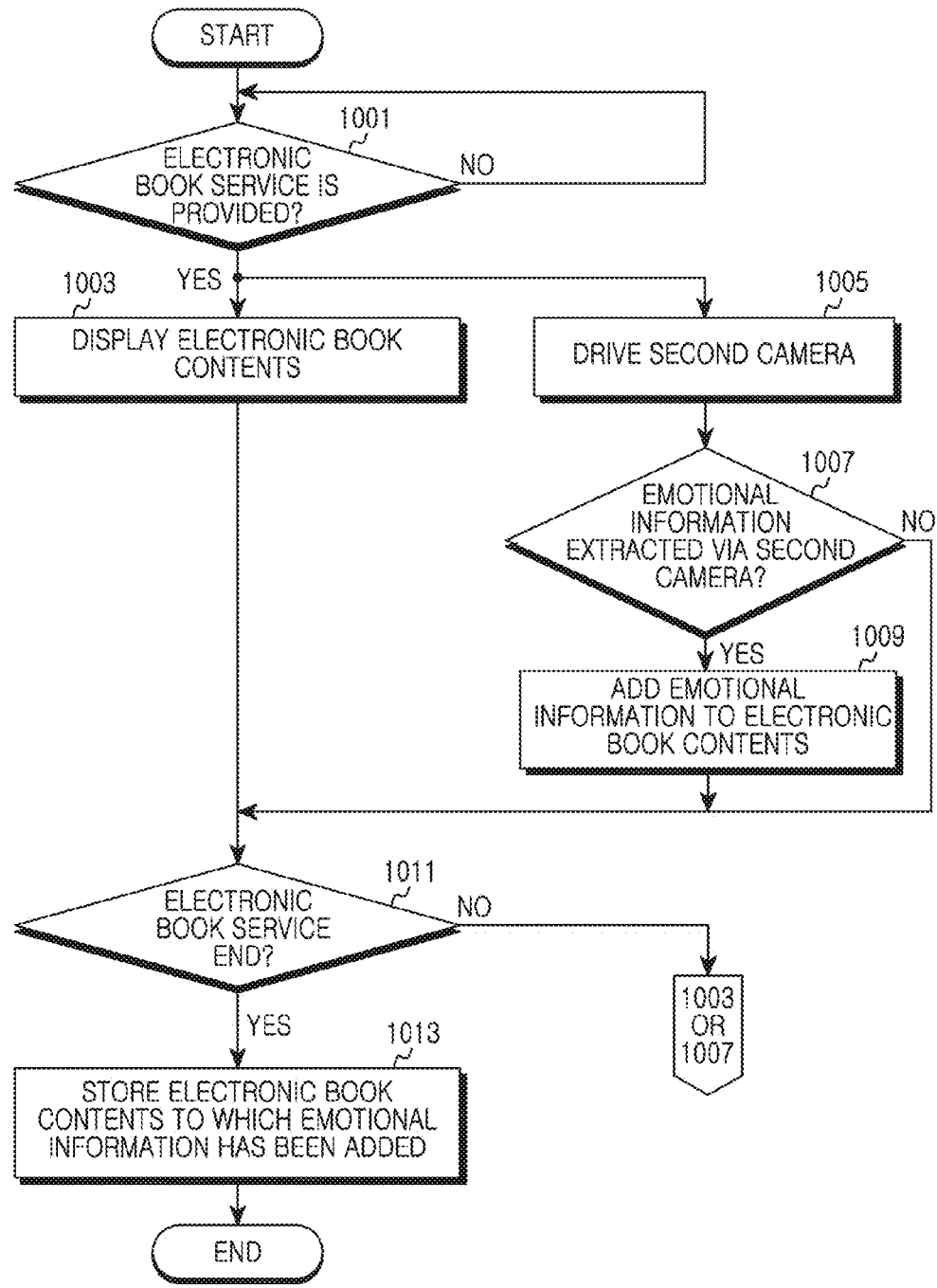
FIG. 10 is a flowchart illustrating a procedure for adding a user's emotional information to electronic book content in an electronic device according to an embodiment of the present disclosure.

FIG. 10 is a flowchart illustrating a procedure for adding a user's emotional information to electronic book content in an electronic device according to an embodiment of the present disclosure.

Referring to FIG. 10, at operation 1001, the electronic device determines whether an electronic book service is provided. For example, the electronic device determines whether one of one or more electronic book files stored in the data storage 112 is selected depending on touch information provided via the input unit 180.

If the electronic device determines that an electronic book service is not provided at operation 1001, then the electronic device may continue to poll for an indication that the electronic book service is provided.

If the electronic device determines that the electronic book service is being provided at operation 1001, then the electronic device proceeds to operation 1003 at which the electronic device displays electronic book content selected for the electronic book service on the display unit 170.

Thereafter, the electronic device proceeds to operation 1011 at which the electronic device determines whether the electronic book service ends.

In addition, if the electronic device determines that the electronic book service is being provided at operation 1001, then the electronic device may also proceed to operation 1005 at which the electronic device drives the second camera unit 150. For example, if the emotion display menu has been set, the electronic device activates the second camera unit 150 positioned in the same direction as the display unit 170 for displaying the electronic book content in order to obtain a user's image while displaying the electronic book content. Thereafter, the electronic device proceeds to operation 1007.

At operation 1007, the electronic device determines whether the user's emotional information is extracted from the user image obtained via the second camera unit 150. For example, the electronic device estimates movements of a plurality of facial muscles for estimating emotional information from the user's facial image obtained via the second camera unit 150. After estimating movements of a plurality of facial muscles for estimating emotional information from the user's facial image, the electronic device extracts the user's emotion with consideration of movement information for the facial muscles. If an emotion estimation value calculated with consideration of the movement information of the facial muscles exceeds a reference emotional value, the electronic device may recognize that the electronic device has extracted the user's emotion for a relevant position of the electronic book content.

If the electronic device determines that the user's emotional information has not been extracted at operation 1007, then the electronic device may proceed to operation 1011 at which the electronic device determines whether the electronic book service ends.

In contrast, if the electronic device determines that the user's emotional information has been extracted at operation 1007, then the electronic device proceeds to operation 1009 at which the electronic device adds the user's emotional information to the electronic book content and displays the same.

Figure 11A:
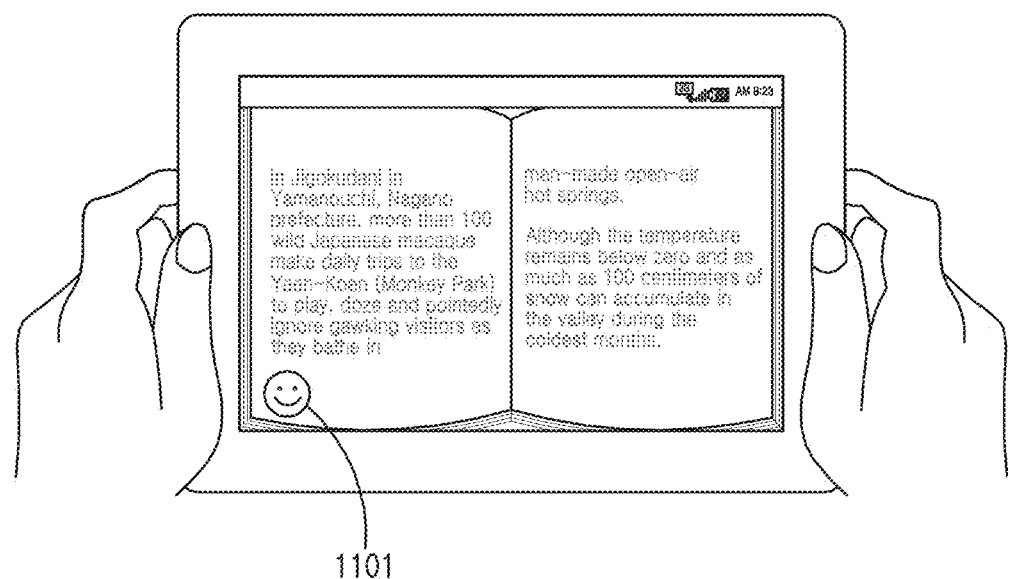
FIGS. 11A and 11B are views illustrating screen configuration for adding a user's emotional information to electronic book content in an electronic device according to an embodiment of the present disclosure.
Figure 11B:
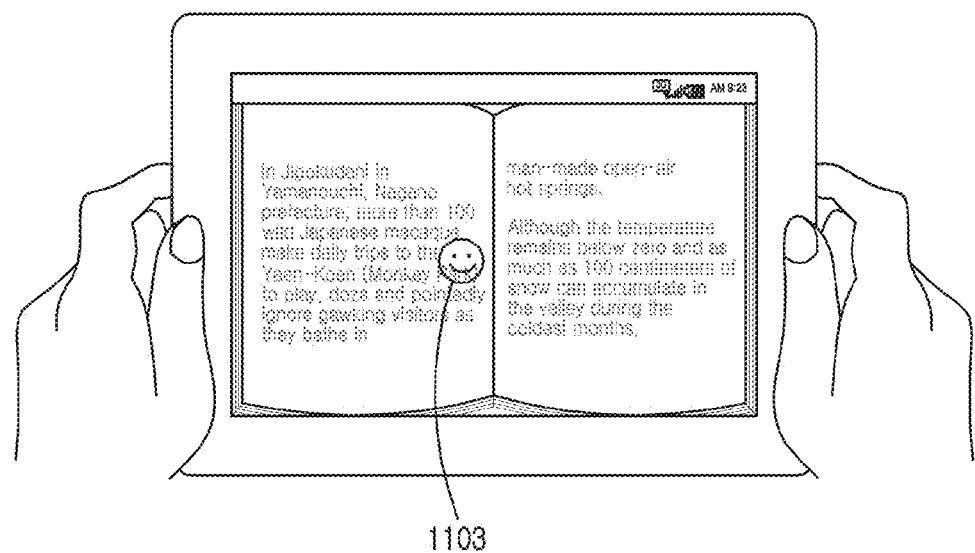

FIGS. 11A and 11B are views illustrating screen configuration for adding a user's emotional information to electronic book content in an electronic device according to an embodiment of the present disclosure.

Referring to FIGS. 11A and 11B, the electronic device adds the user's emotional information 1101 to a page from which the user's emotional information has been extracted and displays the user's emotional information 1101 as illustrated in FIG. 11A. As another example, the electronic device may add the user's emotional information to a sentence or a paragraph from which the user's emotional information has been extracted and display the user's emotional information 1103 as illustrated in FIG. 11B.

At operation 1011, the electronic device determines whether the electronic book service ends.

If the electronic device determines that the electronic book service does not end at operation 1011, then the electronic device proceeds to operation 1003 at which the electronic device displays the electronic book content on the display unit 170.

In addition, if the electronic device determines that the electronic book service does not end at operation 1011, then the electronic device may also proceed to operation 1007 at which the electronic device determines whether the user's emotional information is extracted.

In contrast, if the electronic device determines that the electronic book service ends at operation 1011, then the electronic device proceeds to operation 1013 at which the electronic device stores electronic book content to which the emotional information has been added. For example, the electronic device may add an emotional tag corresponding to the user's emotional information to the electronic book content and store the same. As another example, the electronic device may generate metadata including the user's emotional information obtained from the electronic book content and store the same together with the electronic book content. According to various embodiments of the present disclosure, the metadata including the user's emotional information includes information of a position at which the user's emotional information has been extracted from the electronic book content together.

As described above, the electronic device may add the user's emotional information to the electronic book content. If the electronic book contents is intended for learning, the electronic device may control a learning level of difficulty with consideration of the user's emotional information for the electronic book content.

Figure 12:
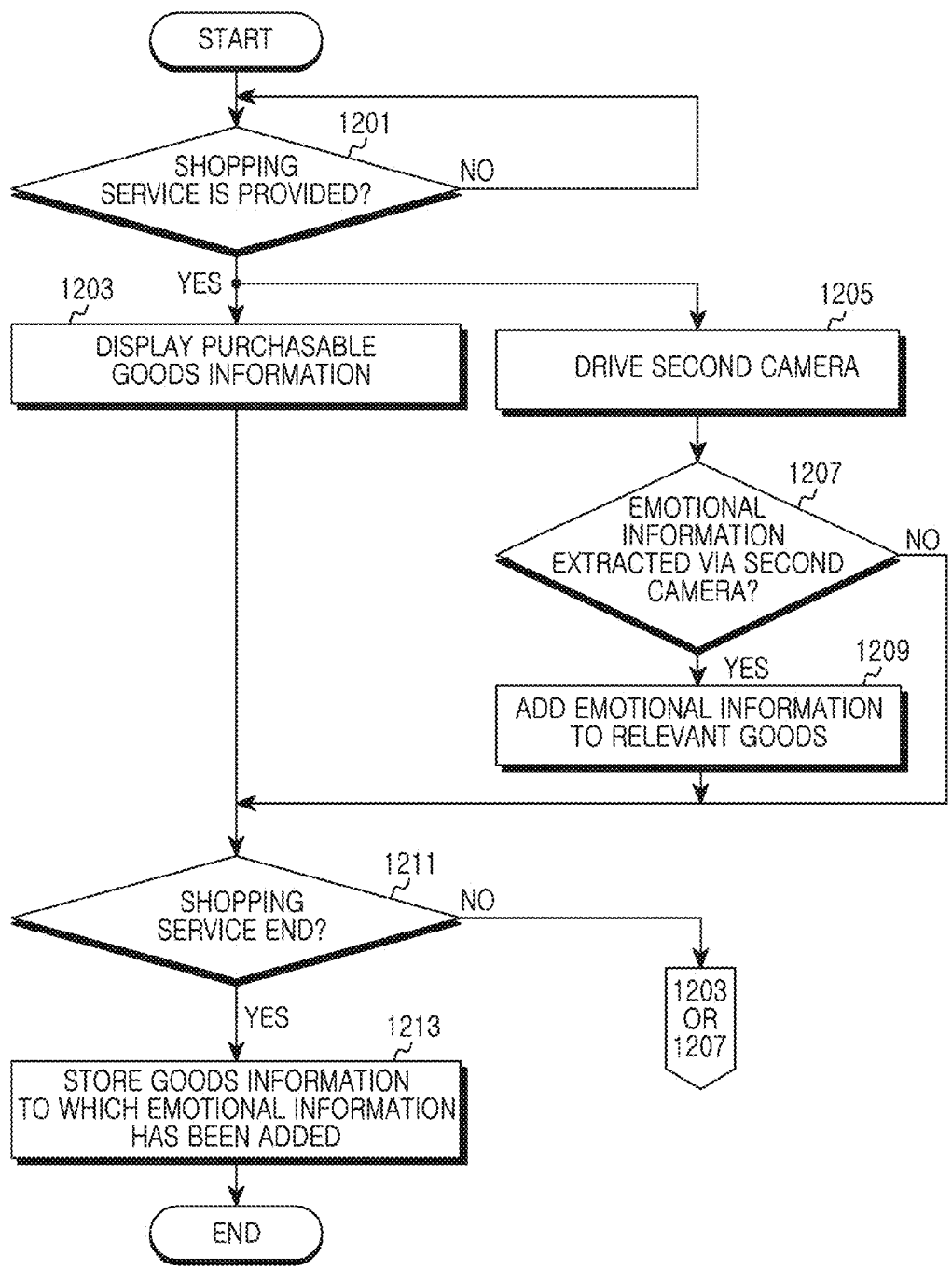
FIG. 12 is a flowchart illustrating a procedure for adding a user's emotional information to shopping information in an electronic device according to an embodiment of the present disclosure.

FIG. 12 is a flowchart illustrating a procedure for adding a user's emotional information to shopping information in an electronic device according to an embodiment of the present disclosure.

Referring to FIG. 12, at operation 1201, the electronic device determines whether a shopping service is provided. For example, the electronic device determines whether a shopping icon is selected depending on touch information provided via the input unit 180.

If the electronic device determines that a shopping service is not being provided at operation 1201, then the electronic device may continue to poll for an indication that the shopping service is being provided.

If the electronic device determines that the shopping service is being provided at operation 1201, then the electronic device proceeds to operation 1203 at which the electronic device displays purchasable goods information on the display unit 170. Thereafter, the electronic device proceeds to operation 1211.

At operation 1211, the electronic device determines whether a shopping service ends.

In addition, if the electronic device determines that the shopping service is being provided at operation 1201, then the electronic device may also proceed to operation 1205 at which the electronic device drives the second camera unit 150. For example, if the emotion display menu has been set, the electronic device activates the second camera unit 150 positioned in the same direction as the display unit 170 for displaying the goods information in order to obtain a user's image while displaying the purchasable goods information. Thereafter, the electronic device proceeds to operation 1207.

At operation 1207, the electronic device determines whether the user's emotional information is extracted from the user image obtained via the second camera unit 150. For example, the electronic device estimates movements of a plurality of facial muscles for estimating emotional information from the user's facial image obtained via the second camera unit 150. After estimating movements of a plurality of facial muscles for estimating emotional information from the user's facial image, the electronic device extracts the user's emotion with consideration of movement information for the facial muscles. If an emotion estimation value calculated with consideration of the movement information of the facial muscles exceeds a reference emotional value, the electronic device may recognize that the electronic device has extracted the user's emotion for the relevant goods information.

If the electronic device determines that the user's emotional information has not been extracted at operation 1207, then the electronic device proceeds to operation 1211 at which the electronic device determines whether the shopping service ends.

If the electronic device determines that the user's emotional information has been extracted at operation 1207, then the electronic device proceeds to operation 1209 at which the electronic device adds the user's emotional information to the goods information and displays the same. For example, the electronic device may add the user's emotional information to the goods information from which the user's emotional information has been extracted among a list of purchasable goods, and display the same. As another example, the electronic device may add the user's emotional information to goods detail information of goods from which the user's emotional information has been extracted among one or more purchasable goods, and display the same.

At operation 1211, the electronic device determines whether the shopping service ends.

If the electronic device determines that the shopping service does not end at operation 1211, then the electronic device proceeds to operation 1203 at which the electronic device displays purchasable goods information on the display unit 170.

In addition, if the electronic device determines that the shopping service does not end at operation 1211, then the electronic device may also proceed to operation 1207 at which the electronic device determines whether the user's emotional information is extracted.

In contrast, if the electronic device determines that the shopping service ends at operation 1211, then the electronic device proceeds to operation 1213 at which the electronic device stores the goods information to which the emotional information has been added. For example, the electronic device may add an emotional tag corresponding to the user's emotional information to the goods information from which the user's emotional information has been extracted, and store the same. As another example, the electronic device may generate metadata including the user's emotional information obtained from the goods information, and store the same together with the goods information.

Figure 13:
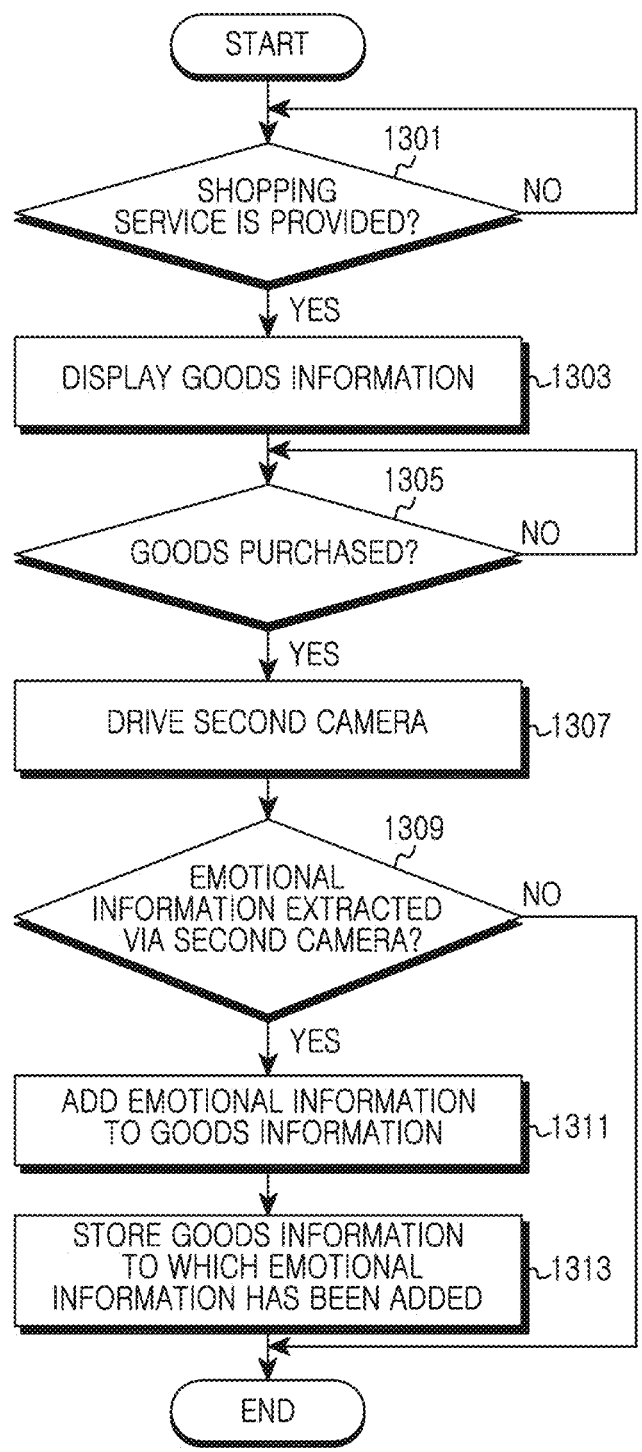
FIG. 13 is a flowchart illustrating a procedure for adding a user's emotional information to shopping information in an electronic device according to an embodiment of the present disclosure.

FIG. 13 is a flowchart illustrating a procedure for adding a user's emotional information to shopping information in an electronic device according to an embodiment of the present disclosure.

Referring to FIG. 13, at operation 1301, the electronic device determines whether a shopping service is provided. For example, the electronic device determines a shopping icon is selected depending on touch information provided via the input unit 180.

If the electronic device determines that a shopping service is not being provided at operation 1301, then the electronic device may continue to poll for an indication that the shopping service is provided.

If the electronic device determines that the shopping service is being provided at operation 1301, then the electronic device proceeds to operation 1303 at which the electronic device displays purchasable goods information on the display unit 170.

At operation 1305, the electronic device determines whether a goods purchase event occurs.

If the electronic device determines that the goods purchase event does not occur at operation 1305, then the electronic device may continue to poll for an indication that the goods purchase event occur, while the electronic device displays the purchasable goods information on the display unit 170.

In contrast, if the electronic device determines that the goods purchase event occurs at operation 1305, then the electronic device may proceed to operation 1307 at which the electronic device drives the second camera unit 150. For example, if the emotion display menu has been set, the electronic device activates the second camera unit 150 positioned in the same direction as the display unit 170 for displaying goods information in order to obtain a user's image while displaying the purchasable goods information.

Thereafter, at operation 1309, the electronic device determines whether the user's emotional information is extracted from the user image obtained via the second camera unit 150. For example, the electronic device estimates movements of a plurality of facial muscles for estimating emotional information from the user's facial image obtained via the second camera unit 150. After estimating movements of a plurality of facial muscles for estimating emotional information from the user's facial image, the electronic device extracts the user's emotion with consideration of movement information for the facial muscles. If an emotion estimation value calculated with consideration of the movement information of the facial muscles exceeds a reference emotional value, the electronic device may recognize that the electronic device has extracted the user's emotion for the relevant goods information.

If the electronic device determines that the user's emotional information has not been extracted, then the electronic device ends the procedure for adding the user's emotional information to shopping information.

In contrast, if the electronic device determines that the user's emotional information has been extracted at operation 1309, then the electronic device proceeds to operation 1311 at which the electronic device adds the user's emotional information to the goods information and displays the same. For example, the electronic device may add the user's emotional information to goods information from which the user's emotional information has been extracted among a purchasable goods list and display the same. As another example, the electronic device may add the user's emotional information to goods detail information of goods from which the user's emotional information has been extracted among one or more purchasable goods, and display the same. Thereafter, the electronic device proceeds to operation 1313.

At operation 1313, the electronic device stores the goods information to which the emotional information has been added. For example, the electronic device may add an emotional tag corresponding to the user's emotional information to the goods information from which the user's emotional information has been extracted, and store the same. As another example, the electronic device may generate metadata including the user's emotional information obtained from the goods information, and store the same together with the goods information.

As described above, when adding the user's emotional information for the goods information, the electronic device may transmit the user's emotional information added to the goods information to a shopping server. In this case, the shopping server may display a user compliance rate for relevant goods with consideration of the user's emotional information for the specific goods collected from a plurality of electronic devices. For example, the electronic device may use the users' emotional information for marketing of the relevant goods.

As described above, the electronic device may add the extracted user's emotional information to relevant content when using the content. Accordingly, the electronic device may manage at least one content stored in the data storage 112 with consideration of the user's emotional information for each content.

Figure 14:
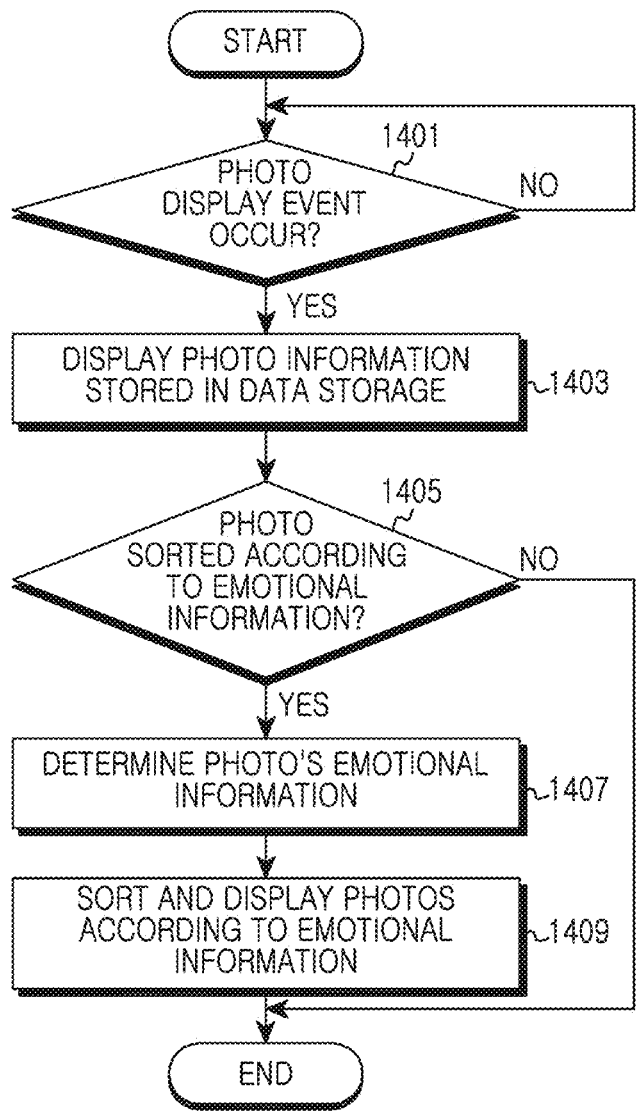
FIG. 14 is a flowchart illustrating a procedure for displaying a photo with consideration of emotional information in an electronic device according to an embodiment of the present disclosure.

FIG. 14 is a flowchart illustrating a procedure for displaying a photo with consideration of emotional information in an electronic device according to an embodiment of the present disclosure.

Referring to FIG. 14, at operation 1401, the electronic device determines whether a photo display event occurs. For example, the electronic device determines whether selection of a photo display icon is detected depending on touch information provided via the input unit 180.

If the electronic device determines that the a photo display event does not occur at operation 1401, then the electronic device may continue to poll for an indication that a photo display event occurs.

If the electronic device determines that the photo display event occurs at operation 1401, then the electronic device proceeds to operation 1403 at which the electronic device displays a photo list for at least one photo stored in the data storage 112 on the display unit 170.

FIGS. 15A, 15B, 15C, and 15D are views illustrating screen configuration for displaying a photo with consideration of emotional information in an electronic device according to an embodiment of the present disclosure.

Referring to 15A, 15B, 15C, and 15D, the electronic device displays the photo list for at least one photo stored in the data storage 112 on the display unit 170 as illustrated in FIG. 15A.

At operation 1405, the electronic device determines whether a sort event corresponding to emotional information occurs. For example, the electronic device determines whether emotional information ("emotion") 1503 is selected as a sort condition 1501 for a photo as illustrated in FIG. 15A.

If the electronic device determines that a sort event corresponding to emotional information does not occur at operation 1405, then the electronic device ends the procedure for displaying a photo with consideration of emotional information.

If the electronic device determines that a sort event corresponding to emotional information does occur at operation 1405, the electronic device proceeds to operation 1407 at which the electronic device determines the user's emotional information added to each photo stored in the data storage 112. For example, the electronic device determines the user's emotional information for each photo via an emotional tag tagged to a photo. As another example, the electronic device may determine the user's emotional information for each photo with consideration of metadata for emotional information stored in the data storage 112. Thereafter, the electronic device proceeds to operation 1409.

At operation 1409, the electronic device sorts and displays at least one photo file stored in the data storage 112 depending on the user's emotional information. For example, as illustrated in FIG. 15B, the electronic device may group and display at least one photo file depending on the user's emotional information. After grouping and displaying at least one photo file depending on the user's emotional information, in the case in which selection of a "happiness" folder 1505 is detected as illustrated in FIG.

Figure 15D:
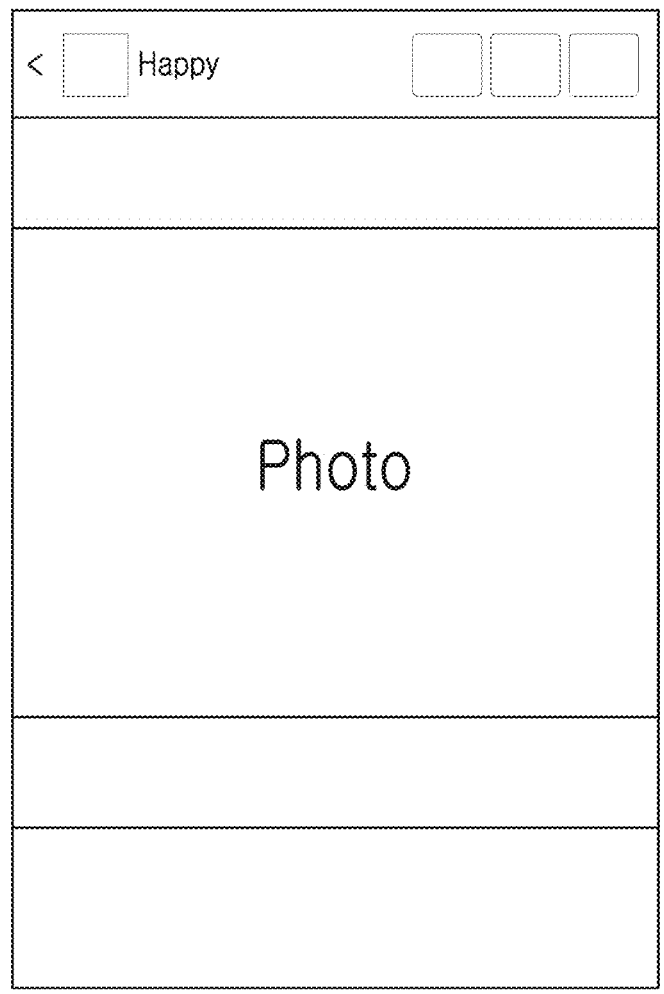

15B, the electronic device displays at least one file list including emotion of "happiness" on the display unit 170 as illustrated in FIG. 15C. In addition, when selection of a specific photo file 1507 is detected in a file list, the electronic device may display the selected photo file on the display unit 170 as illustrated in FIG. 15D. Additionally, the electronic device may display a thumbnail of a moving picture together with a photo list depending on the user's emotional information as illustrated in FIG. 15C. When selection of a thumbnail of a moving picture 1509 is detected, the electronic device may reproduce the moving picture for the thumbnail as illustrated in FIGS. 19B and 19C. The electronic device may reproduce the moving picture from a point displayed by the thumbnail.

According to the above various embodiments of the present disclosure, in the case in which the electronic device displays a photo list and then a sort event corresponding to emotional information occurs, the electronic device may determine emotional information for each photo to sort and display photos depending on the emotional information.

According to various embodiments of the present disclosure, if emotional information is set as a basic sort condition, when a photo display event occurs at operation 1401, the electronic device determines the user's emotional information added to each photo stored in the data storage 112 at operation 1407. Thereafter, at operation 1409, the electronic device sorts and displays one or more photo files stored in the data storage 112 depending on the user's emotional information.

According to various embodiments of the present disclosure, if the emotional information display menu has been set, when displaying a photo list, the electronic device may display an emotion display icon on a photo to which emotional information has been added. Specifically, when a photo display event occurs, the electronic device determines whether the emotional information display menu has been set. If the emotional information display menu has been set, the electronic device determines the user's emotional information added to each photo stored in the data storage 112. After determining the user's emotional information added to each photo, the electronic device may display an emotion display icon on a photo to which emotional information has been added.

Figure 16:
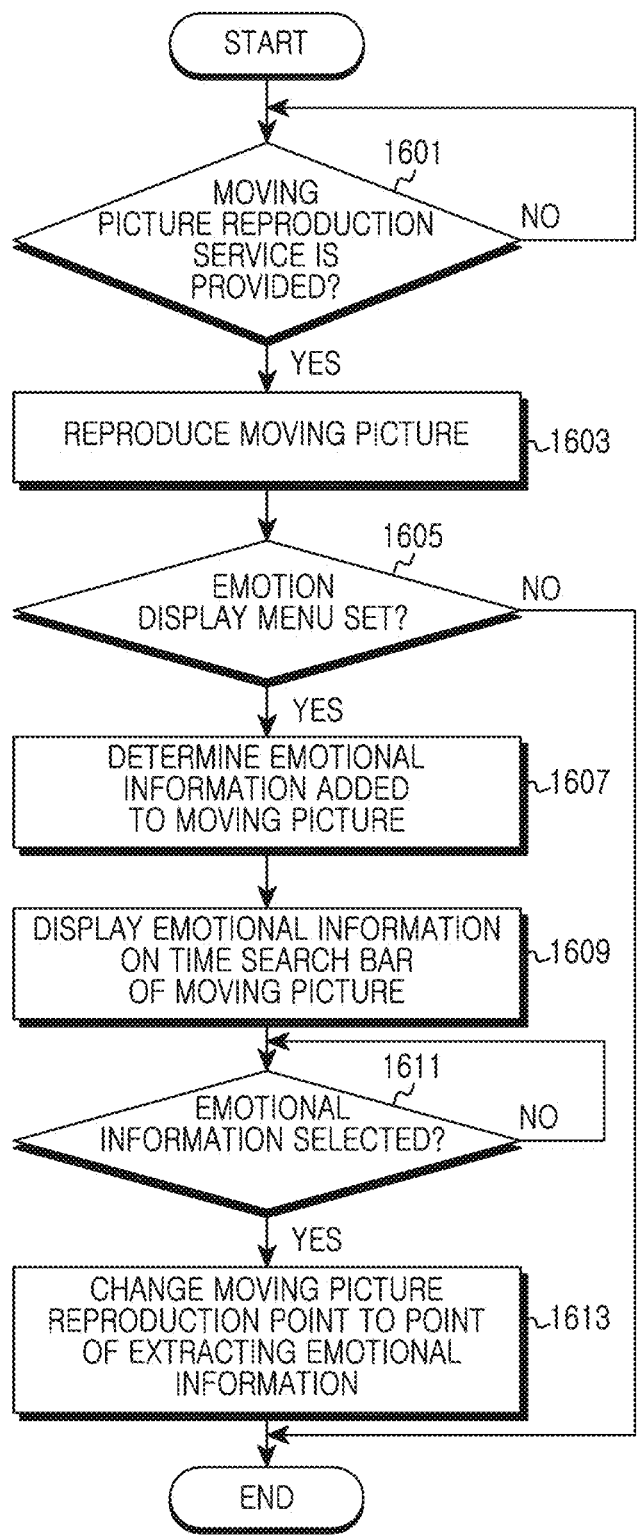
FIG. 16 is a flowchart illustrating a procedure for displaying moving picture information with consideration of emotional information in an electronic device according to an embodiment of the present disclosure.

FIG. 16 is a flowchart illustrating a procedure for displaying moving picture information with consideration of emotional information in an electronic device according to an embodiment of the present disclosure.

Referring to FIG. 16, at operation 1601, the electronic device determines whether a moving picture reproduction service is provided. For example, the electronic device determines whether one of one or more moving picture files stored in the data storage 112 is selected depending on touch information provided via the input unit 180.

If the electronic device determines that the moving picture reproduction service is not being provided at operation 1601, then the electronic device may continue to poll for an indication that the moving picture reproduction service is being provided.

If the electronic device determines that the moving picture reproduction service is being provided at operation 1601, then the electronic device proceeds to operation 1603 at which the electronic device reproduces the moving picture selected for the moving picture reproduction service. For example, the electronic device reproduces the moving picture and displays the same on the display unit 170 as illustrated in FIG. 18A.

At operation 1605, the electronic device determines whether an emotional information display event occurs. For example, the electronic device determines whether selection of the emotional information display menu is detected depending on touch information provided via the input unit 180.

If the electronic device determines that the emotional information display event does not occur at operation 1605, then the electronic device may end the procedure for displaying moving picture information with consideration of emotional information. For example, the electronic device constantly reproduces the moving picture selected for the moving picture reproduction service.

If the electronic device determines that the emotional information display event occurs at operation 1605, then the electronic device proceeds to operation 1607 at which the electronic device determines the user's emotional information added to the moving picture. For example, the electronic device may determine the user's emotional information added to a moving picture via an emotional tag tagged to a frame forming the moving picture. As another example, the electronic device may determine the user's emotional information for the moving picture with consideration of metadata for emotional information stored in the data storage 112. Thereafter, the electronic device proceeds to operation 1609.

At operation 1609, the electronic device displays the user's emotional information when reproducing the moving picture. For example, as illustrated in FIG. 18B, the electronic device displays the user's emotional information 1801 and 1803 at a point of extracting the user's emotion from the time search bar of the moving picture being reproduced. Additionally, as illustrated in FIG. 18C, if the user of the electronic device controls a reproduction point of the moving picture using the time search bar, the electronic device may display the user's emotional information 1805 at a point of extracting the user's emotion. Thereafter, the electronic device proceeds to operation 16113.

At operation 1611, the electronic device determines whether selection of emotional information displayed on the time search bar is detected.

If the electronic device determines that selection of emotional information displayed on the time search bar is not detected at operation 1611, then the electronic device may continue to poll for an indication that selection of emotional information displayed on the time search bar is detected.

In contrast, if the electronic device determines that selection of the emotional information displayed on the time search bar is detected at operation 1611, then the electronic device may proceed to operation 1613 at which the electronic device changes a reproduction point of the moving picture to the point at which the emotional information selected in operation 1611 has been extracted. For example, if selection of emotional information "depression" 1801 is detected from the emotional information illustrated in FIG. 18B, the electronic device changes the reproduction point of the moving picture to the point of extracting the emotional information "depression" 1801.

According to the above various embodiments of the present disclosure, if the electronic device determines that an emotional information display event occurs at operation 1605 while reproducing the moving picture at operation 1603, then the electronic device may display the user's emotional information added to the moving picture on the display unit 170.

According to various embodiments of the present disclosure, if the emotional information display menu has been set, then the electronic device may display the user's emotional information added to the moving picture from a moving picture reproduction point. In this case, the electronic device determines the emotional information added to the moving picture for reproduction before reproducing the moving picture.

Figure 17:
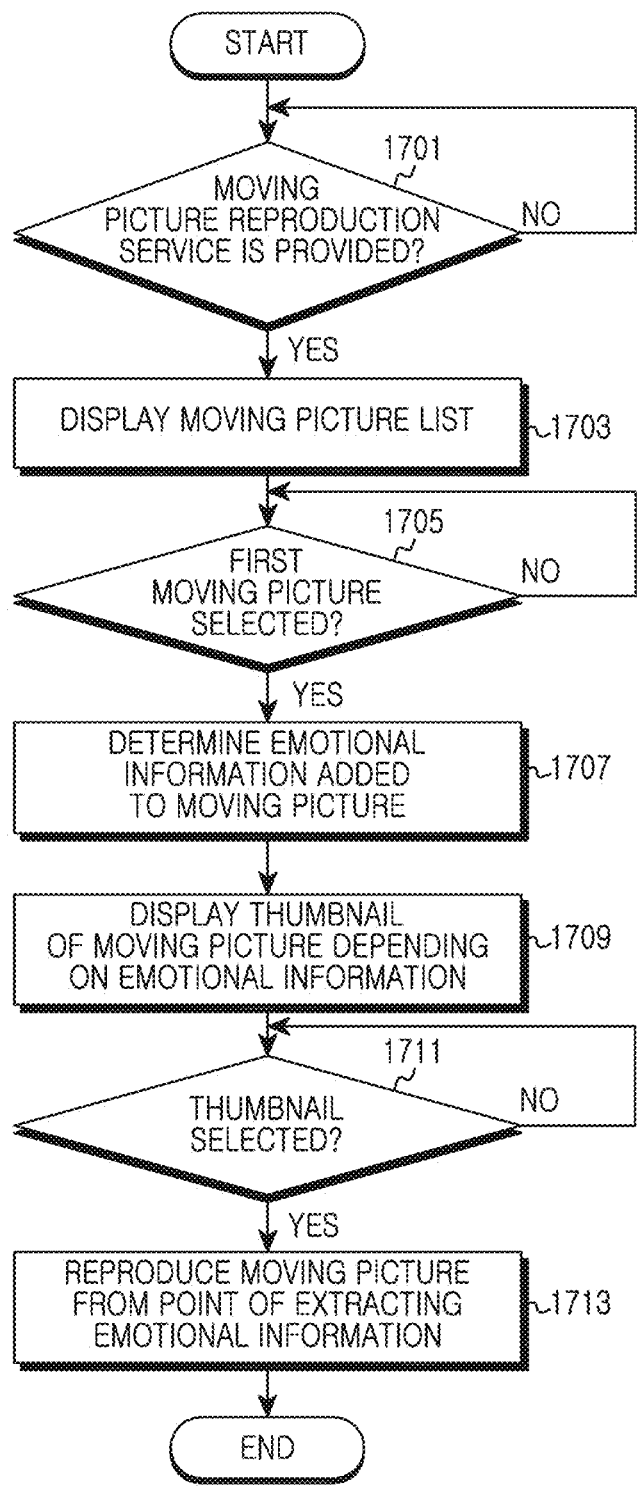
FIG. 17 is a flowchart illustrating a procedure for displaying moving picture information with consideration of emotional information in an electronic device according to an embodiment of the present disclosure.

FIG. 17 is a flowchart illustrating a procedure for displaying moving picture information with consideration of emotional information in an electronic device according to another embodiment of the present disclosure.

Referring to FIG. 17, at operation 1701, the electronic device determines whether to provide a moving picture reproduction service. For example, the electronic device determines whether an icon of a moving picture reproduction application is selected depending on touch information provided via the input unit 180.

If the electronic device determines that the moving picture reproduction service is not being provided at operation 1701, then the electronic device may continue to poll for an indication that moving picture reproduction service is being provided.

If the electronic device determines that the moving picture reproduction service is being provided at operation 1701, then the electronic device proceeds to operation 1703 at which the electronic device displays a moving picture file list for at least one moving picture file stored in the data storage 112 on the display unit 170. Thereafter, the electronic device proceeds to operation 1705.

At operation 1705, the electronic device determines whether selection of a first moving picture file which is one of moving picture files in the moving picture file list is detected.

If the electronic device determines that selection of the first moving picture file is not detected at operation 1705, then the electronic device may continue to poll for an indication that selection of the first moving picture file is detected.

If the electronic device determines that selection of the first moving picture file is detected at operation 1705, then the electronic device may proceed to operation 1707 at which the electronic device determines the user's emotional information included in the first moving picture file. For example, the electronic device determines the user's emotional information added to the first moving picture file via an emotional tag tagged to a frame forming the first moving picture file. As another example, the electronic device may determine the user's emotional information for the first moving picture file with consideration of metadata for emotional information stored in the data storage 112. Thereafter, the electronic device proceeds to operation 1709.

At operation 1709, the electronic device displays a thumbnail for the user's emotional information added to the first moving picture file on the display unit 170.

FIGS. 19A, 19B, and 19C are views illustrating screen configuration for displaying a moving picture with consideration of emotional information in an electronic device according to an embodiment of the present disclosure.

Referring to FIG. 19A, the electronic device displays a thumbnail of a point of extracting the user's emotional information from the first moving picture file on the display unit 170.

At operation 1711, the electronic device determines whether one of one or more thumbnails representing the user's emotional information for the first moving picture is selected. For example, as illustrated in FIG. 19A, the electronic device determines whether selection of a first thumbnail 1901 is detected among thumbnails for the first moving picture.

If the electronic device determines that one of one or more thumbnails representing the user's emotional information for the first moving picture is not selected at operation 1711, then the electronic device may continue to poll for an indication that one of one or more thumbnails representing the user's emotional information for the first moving picture is selected.

If the electronic device determines that selection of one of one or more thumbnails representing the user's emotional information for the first moving picture is detected at operation 1711, then the electronic device proceeds to operation 1713 at which the electronic device reproduces the moving picture from a point from which emotional information of the thumbnail has been extracted in operation 1713. For example, as illustrated in FIGS. 19B and 19C, the electronic device reproduces the moving picture from a point from which emotional information of the thumbnail has been extracted. The electronic device may display the thumbnail information for the first moving picture or thumbnail information including the same emotional information as the thumbnail selected at operation 1711 on a partial region 1903 of the display unit 170 as illustrated in FIG. 19B. Meanwhile, as illustrated in FIG. 19C, the electronic device may display emotional information 1905 and 1907 for the first moving picture on the time search bar of the first moving picture According to the above various embodiments of the present disclosure, the electronic device may display a thumbnail for each emotional information added to the first moving picture as illustrated in FIG. 19A.

According to various embodiments of the present disclosure, the electronic device may display only a thumbnail of a point at which emotional information has changed inside the first moving picture.

Figure 20:
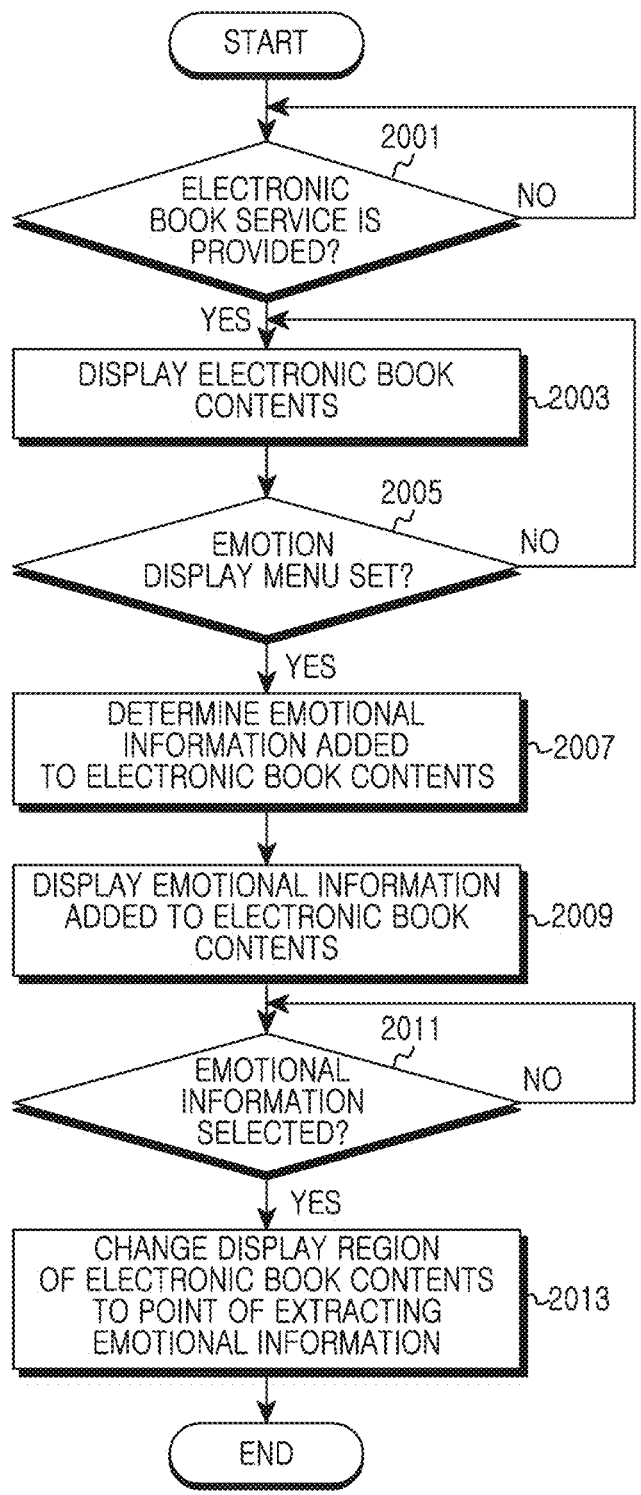
FIG. 20 is a flowchart illustrating a procedure for displaying electronic book content with consideration of emotional information in an electronic device according to an embodiment of the present disclosure.

FIG. 20 is a flowchart illustrating a procedure for displaying electronic book content with consideration of emotional information in an electronic device according to an embodiment of the present disclosure.

Referring to FIG. 20, at operation 2001, the electronic device determines whether an electronic book service is provided. For example, the electronic device determines whether one of electronic book content stored in the data storage 112 is selected depending on touch information provided via the input unit 180.

If the electronic device determines that the electronic book service is not being provided at operation 2001, then the electronic device may continue to poll for an indication that the electronic book service is being provided.

If the electronic device determines that the electronic book service is being provided at operation 2001, then the electronic device proceeds to operation 2003 at which the electronic device displays electronic book content selected for the electronic book service on the display unit 170.

At operation 2005, the electronic device determines whether an emotional information display event occurs. For example, the electronic device determines whether selection of the emotional information display menu is detected depending on touch information provided via the input unit 180.

If the electronic device determines that the emotional information display event does not occur at operation 2005, then the electronic device proceeds to operation 2003 at which the electronic device constantly displays electronic book content selected for the electronic book service on the display unit 170.

In contrast, if the electronic device determines that the emotional information display event occurs at operation 2005, then the electronic device proceeds to operation 2007 at which the electronic device determines the user's emotional information added to the electronic book content. For example, the electronic device may determine the user's emotional information added to the electronic book content via an emotional tag tagged to the electronic book content. As another example, the electronic device may determine the user's emotional information added to the electronic book content with consideration of metadata for emotional information stored in the data storage 112. Thereafter, the electronic device proceeds to operation 2009.

At operation 2009, the electronic device displays the user's emotional information including position information where the emotional information has been extracted from the electronic book content on the display unit 170. For example, as illustrated in FIG. 22A, the electronic device displays a structure window 2201 for the emotional information added to the electronic book content on the display unit 170 as illustrated in FIG. 22A. The structure window 2201 classifies and displays an extraction position of the user's emotional information for each emotion kind.

At operation 2011, the electronic device determines whether selection of the emotional information displayed on the structure window 2201 is detected.

If the electronic device determines that selection of one of one or more emotional information displayed on the structure window 2201 is not detected at operation 2011, then the electronic device may continue to poll for an indication that one of one or more emotional information is selected.

If the electronic device determines that selection of one of one or more emotional information displayed on the structure window 2201 is detected at operation 2011, then the electronic device proceeds to operation 2013 at which the electronic device changes a display region of the electronic book content to the position from which the emotional information whose selection has been detected has been extracted.

According to the above various embodiments of the present disclosure, the electronic device may display the emotional information added to the electronic book content using the emotional information structure window 2201.

Figure 21:
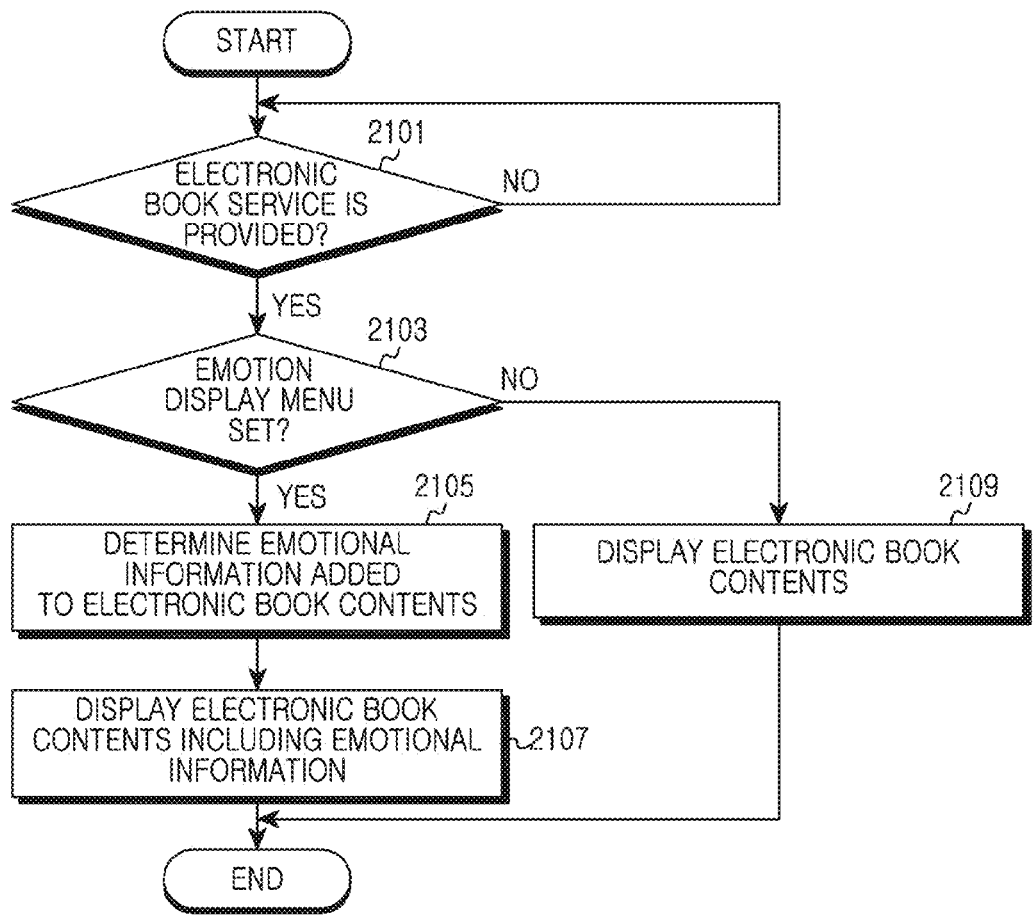
FIG. 21 is a flowchart illustrating a procedure for displaying electronic book content with consideration of emotional information in an electronic device according to an embodiment of the present disclosure.

According to various embodiments of the present disclosure, the electronic device may display the user's emotional information inside the electronic book content as illustrated in FIG. 21.

FIG. 21 is a flowchart illustrating a procedure for displaying electronic book content with consideration of emotional information in an electronic device according to an embodiment of the present disclosure.

Referring to FIG. 21, at operation 2101, the electronic device determines whether an electronic book service is provided. For example, the electronic device determines whether one of one or more electronic book content stored in the data storage 112 is selected depending on touch information provided via the input unit 180.

If the electronic device determines that an electronic book service is not provided at operation 2101, then the electronic device may continue to poll for an indication that the electronic book service is provided.

If the electronic device determines that the electronic book service is being provided at operation 2101, then the electronic device proceeds to operation 2103 at which the electronic device determines whether the emotional display menu has been set.

If the electronic device determines that the emotional display menu has not been set at operation 2103, then the electronic device proceeds to operation 2109 at which the electronic device displays the electronic book content selected for the electronic book service on the display unit 170.

In contrast, if the electronic device determines that the emotional display menu has been set at operation 2103, then the electronic device proceeds to operation 2105 at which the electronic device determines the user's emotional information added to the electronic book content. For example, the electronic device may determine the user's emotional information added to the electronic book content via an emotional tag tagged to the electronic book content. As another example, the electronic device may determine the user's emotional information added to the electronic book content with consideration of metadata for emotional information stored in the data storage 112. Thereafter, the electronic device proceeds to operation 2107.

At operation 2107, the electronic device displays the electronic book content together with emotional information extracted from the electronic book content on the display unit 170. The electronic device displays the user's emotional information at a position at which the emotional information has been extracted in the electronic book content. For example, as illustrated in FIG. 22B, the electronic device may display an emotional icon 2211 depending on the user's emotional information on a page that has extracted the user's emotional information in the electronic book content. As another example, as illustrated in FIG. 22B the electronic device may display an emotional icon 2213 corresponding to the user's emotional information on a paragraph where the user's emotional information has been extracted in the electronic book content. As another example, as illustrated in FIG. 22B the electronic device may mark a shade 2215 corresponding to the user's emotional information on a paragraph where the user's emotional information has been extracted in the electronic book content. At this point, the electronic device may determine at least one of the shape, the color, and the opacity of the shade depending on the user's emotional information. As another example, the electronic device may draw an underline 2217 on a paragraph from which the user's emotional information has been extracted in the electronic book content depending on the user's emotional information as illustrated in FIG. 22B. At this point, the electronic device may determine at least one of the shape, the color, and the thickness of the underline depending on the user's emotional information. As another example, as illustrated in FIG. 22B the electronic device may mark a parenthesis 2219 on a paragraph where the user's emotional information has been extracted in the electronic book content depending on the user's emotional information. The electronic device may determine the shape of a parenthesis depending on the user's emotional information.

Figure 23:
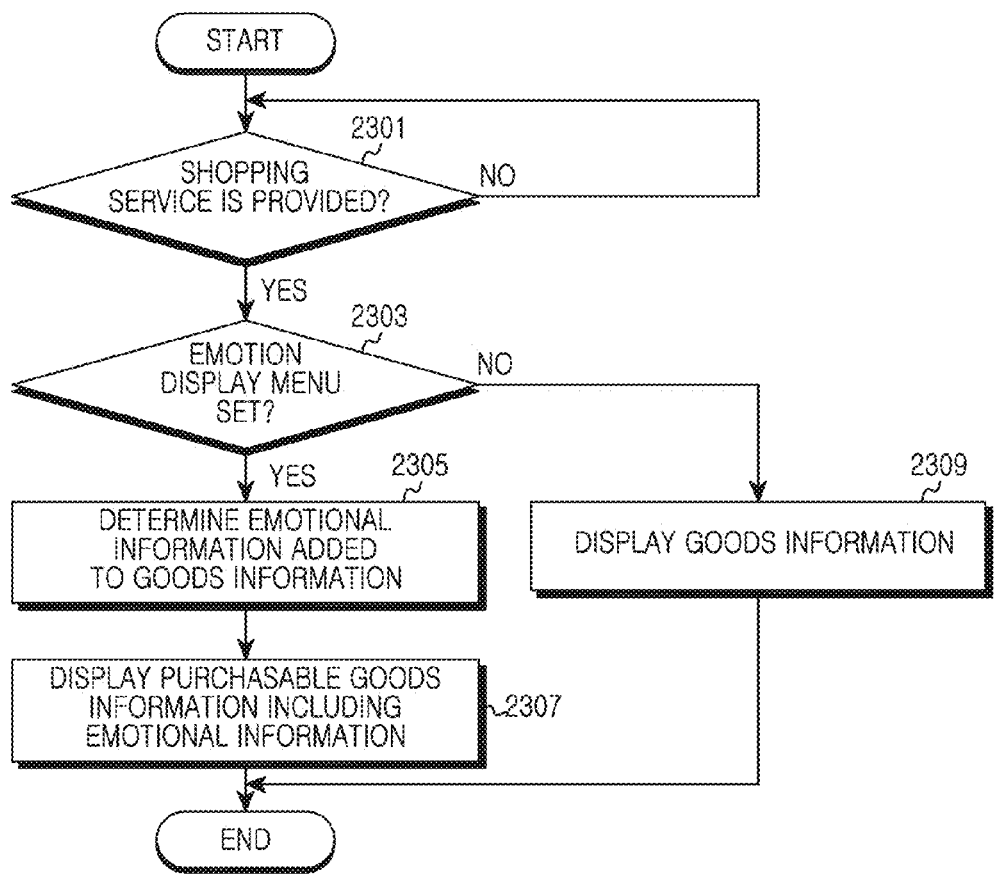
FIG. 23 is a flowchart illustrating a procedure for displaying shopping information with consideration of emotional information in an electronic device according to an embodiment of the present disclosure.

FIG. 23 is a flowchart illustrating a procedure for displaying shopping information with consideration of emotional information in an electronic device according to an embodiment of the present disclosure.

Referring to FIG. 23, at operation 2301, the electronic device determines whether a shopping service is provided. For example, the electronic device determines whether selection of an icon for a shopping application is detected depending on touch information provided via the input unit 180.

If the electronic device determines that the shopping service is not provided at operation 2301, the electronic device may continue to poll for an indication that the shopping service is provided.

If the electronic device determines that the shopping service is being provided at operation 2301, then the electronic device proceeds to operation 2303 at which the electronic device determines whether the emotion display menu has been set.

If the electronic device determines that the emotion display menu has not been set at operation 2303, then the electronic device may proceed to operation 2309 at which the electronic device displays a list of goods purchasable via the shopping service on the display unit 170.

In contrast, if the electronic device determines that the emotion display menu has been set at operation 2303, then the electronic device proceeds to operation 2305 at which the electronic device determines the user's emotional information added to goods information. For example, the electronic device may determine the user's emotional information added to goods information via an emotional tag tagged to each goods information. As another example, the electronic device may determine the user's emotional information added to each goods information with consideration of metadata for emotional information stored in the data storage 112. Thereafter, the electronic device proceeds to operation 2307.

At operation 2307, the electronic device displays the goods information including emotional information on the display unit 170. For example, the electronic device may display an emotional icon on goods information to which the user's emotional information has been added in a purchasable goods list. As another example, in case of displaying detailed information of goods from which the user's emotional information has been extracted among one or more purchasable goods, the electronic device may display the user's emotional information.

According to the above various embodiments of the present disclosure, when using content, the electronic device may extract the user's emotion from image information of the user obtained via a camera.

According to various embodiments of the present disclosure, the electronic device may measure a stimulus degree of the user's sympathetic nerve and parasympathetic nerve to estimate the user's emotion. In this case, the electronic device may further include a skin electricity measurement sensor for measuring the user's skin electricity in addition to the construction of the electronic device 100 illustrated in FIG. 1. For example, the electronic device may measure stimulus information of the sympathetic nerve with consideration of the user's skin electricity measured by the skin electricity measurement sensor. For example, the electronic device measures the user's skin electricity using the skin electricity measurement sensor while driving a music application. After measuring the user's skin electricity, the emotion extract program 114 of the electronic device may estimate the user's emotional information with consideration of the user's skin electricity measured by the skin electricity measurement sensor. If a skin electricity value exceeds a reference emotional value, the emotion extract program 114 may recognize that the electronic device has extracted the user's emotion for music content. Additionally, the electronic device may add relevant emotional information at a point of extracting the user's emotion while reproducing music content.

According to various embodiments of the present disclosure, the electronic device may estimate the user's emotion with consideration of the user's skin temperature change. In this case, the electronic device may further include a skin temperature measurement sensor for measuring the user's skin temperature in addition to the construction of the electronic device 100 illustrated in FIG. 1. For example, the electronic device may extract the user's emotion with consideration of the user's skin temperature change measured by the skin temperature measurement sensor.

According to various embodiments of the present disclosure, the electronic device may estimate the user's emotion with consideration of the user's movement pattern measured by a motion sensor such as an acceleration sensor, a gravity sensor, and the like. In this case, the electronic device may further include a motion sensor in addition to the construction of the electronic device 100 illustrated in FIG. 1.

As described above, the electronic device may provide a service corresponding to the user's emotion depending on content use by estimating the user's emotion and adding the same to relevant contents when using the content, and retrieve, classify, and reproduce at least one content depending on the user's emotion depending on content use.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   displaying, on a touch screen, a preview image based on a first image data obtained from a first camera; and
   in response to detecting a touch input for selecting a capture icon displayed on the touch screen, generating a captured image based on the first image data;
   wherein the generating of the captured image comprises:
   extracting emotional information corresponding to a first emotional type among a plurality of emotional types from a second image data, the second image data obtained from a second camera, determining whether the emotional information is greater than a threshold, adding information corresponding to the emotional information to the captured image based on the determination, and displaying, on the touch screen, a first icon indicating the emotional information with the preview image, wherein the extracted emotional information comprises a time at which the emotional information is extracted.

2. The method of claim 1, wherein the first camera is disposed on a front surface of the electronic device, and the second camera and the touch screen are disposed on a rear surface of the electronic device, opposite to the front side.

3. The method of claim 1, wherein the extracting of the emotional information comprises:

in case of displaying a moving picture reproduction screen on a display unit, extracting emotional information from an image obtained via a camera positioned in the same direction as the display unit while reproducing a moving picture.

4. The method of claim 1, wherein the extracting of the emotional information comprises:

in case of displaying electronic book content on a display unit, extracting emotional information from an image obtained via a camera positioned in the same direction as the display unit while displaying the electronic book content.

5. The method of claim 1, wherein the extracting of the emotional information comprises:

in case of displaying shopping information on a display unit, extracting emotional information from an image obtained via a camera positioned in the same direction as the display unit while displaying the shopping information.

6. The method of claim 1, wherein the adding of the information corresponding to the emotional information comprises:

adding a tag for the emotional information or metadata comprising the emotional information to the captured image.

7. The method of claim 1, further comprising:

in the case in which a content list display event occurs, determining emotional information for at least one content;

grouping the at least one content depending on the emotional information; and displaying the grouped at least one content on a display unit.

8. The method of claim 1, further comprising:

in the case in which a moving picture reproduction event occurs, displaying at least one emotional information on a time search bar of moving picture content; and in the case in which selection of one of the at least one emotional information is detected, changing a reproduction point of the moving picture content depending on time information where the emotional information is positioned.

9. The method of claim 1, further comprising:

in the case in which an electronic book content display event occurs, displaying a structure window comprising a position for at least one emotional information included in the electronic book content; and in the case in which selection of one of the at least one emotional information included in the structure window is detected, changing a display region of the electronic book content displayed on a display unit depending on position information of the emotional information.

10. The method of claim 9, wherein the structure window discriminates the position for the at least one emotional information included in the electronic book content for each emotional kind, and comprises the same.

11. An electronic device comprising:

a memory storing instructions;

a touch screen;

a first camera and a second camera; and a processor operatively coupled to the first camera and the second camera, and configured to:

display, on the touch screen, a preview image based on a first image data obtained from the first camera, and in response to detecting a touch input for selecting a capture icon displayed on the touch screen, generate a captured image based on the first image data, wherein, when the processor generates the captured image, the processor is further configured to:

extract emotional information corresponding to a first emotional type among a plurality of emotional types from a second image data, determine whether the emotional information is greater than a threshold, add information corresponding to the emotional information to the captured image based on the determination, and display, on the touch screen, a first icon indicating the emotional information with the preview image, wherein the extracted emotional information comprises a time at which the emotional information is extracted.

12. The electronic device of claim 11, wherein the first camera is disposed on a front surface of the electronic device, and the second camera and the touch screen are disposed on a rear surface of the electronic device, opposite to the front side.

13. The electronic device of claim 11, wherein in case of displaying a moving picture reproduction screen on the display unit, the processor extracts emotional information from an image obtained via at least one of the at least one camera positioned in the same direction as the display unit while reproducing a moving picture.

14. The electronic device of claim 11, wherein in case of displaying electronic book content on the display unit, the processor extracts emotional information from an image obtained via at least one of the at least one camera positioned in the same direction as the display unit while displaying the electronic book content.

15. The electronic device of claim 11, wherein in case of displaying shopping information on the display unit, the processor extracts emotional information from an image obtained via at least one of the at least one camera positioned in the same direction as the display unit while displaying the shopping information.

16. The electronic device of claim 11, wherein the captured image is generated by adding a tag for the emotional information or metadata comprising the emotional information to the first image data.

17. The electronic device of claim 11, wherein in the case in which a content list display event occurs, the processor determines emotional information for at least one content, and groups the at least one content depending on the emotional information, and displays the grouped at least one content.

18. The electronic device of claim 11, wherein in the case in which a moving picture content reproduction event occurs, the processor displays at least one emotional information on a time search bar of moving picture content via the display unit, and in the case in which selection of one of the at least one emotional information is detected, the processor changes a reproduction point of the moving picture content depending on time information where the emotional information is positioned.

19. The electronic device of claim 11, wherein in the case in which an electronic book content display event occurs, the processor displays a structure window comprising a position for at least one emotional information included in electronic book content on the display unit, and in the case in which selection of at least one emotional information included in the structure window is detected, the processor changes a display region of the electronic book content displayed on the display unit depending on position information of the emotional information.

20. The electronic device of claim 19, wherein the structure window discriminates the position for the at least one emotional information included in the electronic book content for each emotional kind, and comprises the same.

21. A non-transitory computer-readable storage medium storing instructions that, when executed, cause a processor to perform the method of claim 1.

22. The method of claim 1, further comprising generating data based on the captured image, wherein the data comprises data for at least one of a media playback service, a communication viewing service, a communication composition service, a Social Networking Service (SNS), a shopping service, and an on-line dating service.

23. The method of claim 1, wherein the generating of the captured image further comprises:

extracting another emotional information corresponding to a second emotional type among the plurality of emotional types from the second image data;

determining whether the other emotional information is greater than the threshold;

adding information corresponding to the other emotional information to the captured image based on the determination; and displaying the preview image in which the first icon is changed to a second icon indicating the second emotional type, wherein the other emotional information comprises a time at which the emotional information is changed to the other emotional information.

24. The electronic device of claim 11, wherein, when the processor generates the captured image, the processor is further configured to:

extract another emotional information corresponding to a second emotional type among the plurality of emotional types from the second image data;

determine whether the other emotional information is greater than the threshold;

add information corresponding to the other emotional information to the captured image based on the determination; and display the preview image in which the first icon is changed to a second icon indicating the second emotional type, wherein the other emotional information comprises a time at which the emotional information is changed to the another emotional information.

* * * * *